(12) United States Patent
Coté et al.

(10) Patent No.: US 7,425,279 B2
(45) Date of Patent: Sep. 16, 2008

(54) FLUOROCHEMICAL COMPOSITION FOR TREATMENT OF A FIBROUS SUBSTRATE

(75) Inventors: Linda G. Coté, Tucson, AZ (US); E. Steven McAlister, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 445 days.

(21) Appl. No.: 10/513,969

(22) PCT Filed: May 13, 2003

(86) PCT No.: PCT/US03/15088

§ 371 (c)(1),
(2), (4) Date: Nov. 9, 2004

(87) PCT Pub. No.: WO03/100157

PCT Pub. Date: Dec. 4, 2003

(65) Prior Publication Data

US 2005/0171279 A1 Aug. 4, 2005

Related U.S. Application Data

(60) Provisional application No. 60/383,392, filed on May 24, 2002.

(51) Int. Cl.
*C08G 18/28* (2006.01)
*C08G 18/30* (2006.01)
(52) U.S. Cl. .................. 252/8.62; 8/115.6; 524/590; 528/30
(58) Field of Classification Search ............... 252/8.62; 8/115.6; 524/590; 528/30
See application file for complete search history.

(56) References Cited

U.S. PATENT DOCUMENTS

| | | | |
|---|---|---|---|
| 2,567,011 A | 9/1951 | Diesslin et al. |
| 2,764,603 A | 9/1956 | Ahlbrecht |
| 2,803,615 A | 8/1957 | Ahlbrecht et al. |
| 2,839,513 A | 6/1958 | Ahlbrecht et al. |
| 2,941,988 A | 6/1960 | Wolf |
| 2,995,542 A | 8/1961 | Brown |
| 3,250,808 A | 5/1966 | Moore, Jr. et al. |
| 3,274,239 A | 9/1966 | Selman |
| 3,274,244 A | 9/1966 | Mackenzie |
| 3,356,628 A | 12/1967 | Smith et al. |
| 3,412,148 A | 11/1968 | Arbogast |
| 3,446,761 A | 5/1969 | Antonelli et al. |
| 3,450,562 A | 6/1969 | Hoeschele |
| 3,536,710 A | 10/1970 | Bartlett |
| 3,536,749 A | 10/1970 | Groves |
| 3,553,179 A | 1/1971 | Bartlett |
| 3,555,089 A | 1/1971 | Bartlett |
| 3,621,059 A | 11/1971 | Barlett |
| 3,755,242 A | 8/1973 | Reich |
| 3,814,741 A | 6/1974 | Caporiccio et al. |
| 3,862,989 A | 1/1975 | Hansen |
| 3,896,251 A | 7/1975 | Landucci |
| 4,024,178 A | 5/1977 | Landucci |
| 4,215,204 A | 7/1980 | Chattha |
| 4,215,205 A | 7/1980 | Landucci |
| 4,424,438 A | 1/1984 | Antelman et al. |
| 4,487,964 A | 12/1984 | Watson, Jr. et al. |
| 4,508,916 A | 4/1985 | Newell et al. |
| 4,525,423 A | 6/1985 | Lynn et al. |
| 4,529,658 A | 7/1985 | Schwartz et al. |
| 4,587,301 A | 5/1986 | Watson, Jr. et al. |
| 4,668,726 A | 5/1987 | Howells |
| 4,681,925 A | 7/1987 | Strepparola et al. |
| 4,851,472 A | 7/1989 | Famili et al. |
| 4,977,219 A | 12/1990 | Watson, Jr. |
| 5,011,713 A | 4/1991 | Lenti et al. |
| 5,132,028 A | 7/1992 | Nagase et al. |
| 5,276,175 A | 1/1994 | Dams et al. |
| 5,294,248 A | 3/1994 | Chittofrati et al. |
| 5,410,010 A | 4/1995 | Tonelli et al. |
| 5,424,438 A | 6/1995 | Chittofrati et al. |
| 5,623,037 A | 4/1997 | Simeone et al. |

(Continued)

FOREIGN PATENT DOCUMENTS

CA 725740 1/1966

(Continued)

OTHER PUBLICATIONS

Douglas Wicks and Zeno W. Wicks Jr., "Blocked isocyanates III.: Part. A, Mechanisms and chemistry" by Progress in Organic Coatings, 36, pp. 148-172, (1999).
AATCC Technical Manual/1986, AATCC Test Method 22- 1985, "Water Repellency: Spray Test".
AATCC Technical Manual/1986, AATCC Test Method 118-1983, "Oil Repellency: Hydrocarbon Resistance Test".
AATCC Technical Manual/1986, AATCC Test Method 124-1984, "Appearance of Durable Press Fabrics After Repeated Home Laundering".
3M Protective Material Division's "Stain Release Test I" method (Document # 98-0212-0725-7), May 1999.

*Primary Examiner*—Lorna M. Douyon
*Assistant Examiner*—Amina Khan
(74) *Attorney, Agent, or Firm*—Kent S. Kokko

(57) ABSTRACT

The present invention relates to a fluorochemical composition for rendering fibrous substrates oil repellent, water repellent and/or stain or soil repellent. Additionally, the invention also relates to fluorochemical compositions for providing stain release or soil release properties to fibrous substrates. In particular, the present invention relates to fluorochemical compositions that contain a fluorinated polyether compound that can be obtained by reacting an isocyanate component with a particular isocyanate reactive fluorinated polyether compound and a stain release compound. The invention further relates to a method of treating the fibrous substrate with the fluorochemical composition.

15 Claims, No Drawings

U.S. PATENT DOCUMENTS

| | | | |
|---|---|---|---|
| 5,747,629 A | 5/1998 | Yeske et al. | |
| 5,817,249 A | 10/1998 | Audenaert et al. | |
| 5,874,951 A | 2/1999 | Sakakibara et al. | |
| 5,965,659 A | 10/1999 | Kubo et al. | |
| 6,001,923 A | 12/1999 | Moncur et al. | |
| 6,080,830 A | 6/2000 | Dirschl et al. | |
| 6,127,498 A | 10/2000 | Tonelli et al. | |
| 6,239,247 B1 | 5/2001 | Allewaert et al. | |
| 6,242,557 B1 | 6/2001 | Temtchenko et al. | |
| 6,378,572 B1 | 4/2002 | Neubauer et al. | |
| 6,391,459 B1 | 5/2002 | Szum et al. | |
| 6,646,088 B2 * | 11/2003 | Fan et al. | 528/30 |
| 6,890,360 B2 * | 5/2005 | Cote et al. | 8/115.6 |
| 2004/0077237 A1 | 4/2004 | Audenaert et al. | |
| 2004/0077775 A1 | 4/2004 | Audenaert et al. | |
| 2005/0071279 A1 | 3/2005 | Asano | |

FOREIGN PATENT DOCUMENTS

| | | |
|---|---|---|
| EP | 0 435 641 A2 | 7/1991 |
| EP | 0 273 449 B1 | 3/1992 |
| EP | 0 537 578 A2 | 4/1993 |
| EP | 0 615 779 B1 | 9/1994 |
| EP | 0 622 353 A2 | 11/1994 |
| EP | 0 665 253 A1 | 8/1995 |
| EP | 0 695 772 A1 | 2/1996 |
| EP | 0 812 891 A2 | 12/1997 |
| EP | 0 870 778 A1 | 10/1998 |
| EP | 1 038 919 A1 | 9/2000 |
| EP | 0 853 638 B1 | 4/2001 |
| EP | 1 116 759 B1 | 7/2003 |
| FR | 1.362.548 | 4/1963 |
| JP | 4-146917 | 5/1992 |
| JP | 10-81873 | 3/1998 |
| JP | 2000264948 * | 9/2000 |
| WO | WO 92/17636 A1 | 10/1992 |
| WO | WO 93/22282 A2 | 11/1993 |
| WO | WO 96/31545 A1 | 10/1996 |
| WO | WO 97/44303 A1 | 11/1997 |
| WO | WO 98/51726 A1 | 11/1998 |
| WO | WO 99/16800 A2 | 4/1999 |
| WO | WO 01/30873 A1 | 5/2001 |
| WO | WO 02/14443 * | 2/2002 |
| WO | WO 02/14443 A2 | 2/2002 |
| WO | WO 03/099904 A2 | 12/2003 |
| WO | WO 03/099904 A3 | 12/2003 |

* cited by examiner

US 7,425,279 B2

FLUOROCHEMICAL COMPOSITION FOR TREATMENT OF A FIBROUS SUBSTRATE

CROSS REFERENCE TO RELATED APPLICATIONS

This application claims priority from U.S. Provisional Application Ser. No. 60/383,392, filed May 24, 2002.

FIELD OF INVENTION

The present invention relates to a fluorochemical composition for rendering fibrous substrates oil repellent, water repellent and/or stain or soil repellent. Additionally, the invention also relates to fluorochemical compositions for providing stain release or soil release properties to fibrous substrates. In particular, the present invention relates to fluorochemical compositions that contain a fluorinated polyether compound that can be obtained by reacting an isocyanate component with a particular isocyanate reactive fluorinated polyether compound and a stain release compound. The invention further relates to a method of treating the fibrous substrate with the fluorochemical composition.

BACKGROUND

Compositions for making substrates, in particular fibrous substrates, such as textile, oil- and water repellent have been long known in the art. When treating fibrous substrates and in particular textile such as apparel, it is desired that the textile retains its look and feel as much as possible. Therefore, the composition should normally not contain components that would affect the look of the product, i.e. the treatment should be substantially invisible to the unaided human eye. Also, the feel of the substrate should preferably be substantially unaffected. Typically this means that only low amounts of the solids of the composition can be applied. Accordingly, an oil- and/or water repellent composition should be highly effective in rendering a substrate repellent.

Commercially available oil- and/or water repellent compositions are typically based on fluorinated compounds that have a perfluorinated aliphatic group. Such compositions are also described in for example U.S. Pat. No. 5,276,175 and EP 435 641. The commercial success of this type of composition can be attributed to their high effectiveness. Fluorinated compounds based on perfluorinated ether moieties have also been described in the prior art for rendering fibrous substrates oil- and/or water repellent. For example, perfluorinated polyether compounds have been disclosed in EP 1 038 919, EP 273 449, JP-A-04-146917, JP-A-10-081873, U.S. Pat. No. 3,536,710, U.S. Pat. No. 3,814,741, U.S. Pat. No. 3,553,179 and U.S. Pat. No. 3,446,761. It was found that previously disclosed compositions based on perfluorinated polyether compounds may not be very effective in rendering a fibrous substrate oil- and/or water repellent.

Accordingly, it is a desire to find fluorochemical compositions based on a perfluorinated polyether compound that can provide good to excellent oil- and/or water repellency properties to a fibrous substrate. Preferably, the fluorochemical composition is capable of providing durable oil- and/or water repellency properties to a fibrous substrate such that a treated fibrous substrate can substantially maintain the repellency properties even after several washing cycles. Preferably a fibrous substrate treated with the fluorochemical composition has a soft feel, preferably the feel of a treated fibrous substrate is either the same or softer compared to the untreated fibrous substrate. It is a further desire that the fluorochemical compositions can be easily and efficiently manufactured at a low cost. It is further desired to find compositions that have environmentally beneficial properties.

SUMMARY OF THE INVENTION

The present invention provides in one aspect a fluorochemical composition comprising a dispersion or a solution of a fluorinated compound, wherein said fluorinated compound comprises the reaction product of a combination of reactants comprising:

(i) a fluorinated polyether according to the formula:

$$R_f\text{-}Q\text{-}T_k \qquad (I)$$

wherein $R_f$ represents a monovalent perfluorinated polyether group having a molecular weight of at least 750 g/mol, Q represents a chemical bond or a divalent or trivalent organic linking group, T represents a functional group capable of reacting with an isocyanate and k is 1 or 2;

(ii) an isocyanate component selected from a polyisocyanate compound that has at least 3 isocyanate groups or a mixture of polyisocyanate compounds wherein the average number of isocyanate groups per molecule is more than 2; and (iii) optionally one or more co-reactants capable of reacting with an isocyanate group.

The invention further provides a method of treatment of a fibrous substrate with the fluorochemical composition whereby oil- and/or water repellent properties are provided to the substrate. The fluorochemical composition of the present invention can provide good to excellent repellency properties to the substrate. Moreover, durable oil- and/or water repellency properties can be obtained. The fluorochemical compositions may further provide soil repellency as well as soil or stain release properties. The term "soil and/or stain release" is used to mean that a treated substrate that becomes soiled or stained can be more easily cleaned in for example a home laundering than an untreated substrate that becomes soiled or stained. Soil/stain repellency on the other hand refers to the ability of the treated substrate to repel soil thereby reducing soiling or staining of the substrate.

Generally, the fibrous substrate will retain a soft feel after treatment with the fluorochemical composition. Furthermore, the fluorochemical composition is effective even at low levels of application and the repellency properties may be obtained without the need of a heat treatment step.

Also, the fluorochemical compositions of the present inventions are generally environmentally friendly in that compositions can be obtained that are substantially free of fluorochemical components that eliminate slowly from the body of living organisms. Moreover, it is believed that fluorochemical degradation products that may form likewise eliminate well from the body of living organisms. In particular, indications show that the fluorinated polyether compounds that have a perfluorinated polyether moiety having a molecular weight of at least 750 g/mol and perfluorinated polyether degradation products that may form therefrom would eliminate more effectively from the body of living organisms. In particular, there are indications that fluorinated polyether compounds having a fluorinated polyether moiety derivable from a polycondensation of hexafluoropropylene oxide and having a molecular weight of at least 750 g/mol would more effectively eliminate from the body of living organisms compared to long chain perfluoroaliphatic compounds.

DETAILED DESCRIPTION OF ILLUSTRATIVE EMBODIMENTS OF THE INVENTION

The fluorinated compound used in the fluorochemical composition is obtainable by reacting an isocyanate component and optional co-reactants with a fluorinated polyether according to formula (I) that has an isocyanate reactive group:

$$R_f\text{-}Q\text{-}T_k \qquad (I),$$

wherein $R_f$ represents a monovalent perfluorinated polyether group, Q represents a chemical bond or a divalent or trivalent non-fluorinated organic linking group, T represents a functional group capable of reacting with an isocyanate and k is 1 or 2.

The perfluorinated polyether moiety $R_f$ of the fluorinated polyether of formula (I) preferably corresponds to the formula:

$$R^1_f\text{---}O\text{---}R^2_f\text{---}(R^3_f)_q\text{---} \qquad (II)$$

wherein $R^1_f$ represents a perfluorinated alkyl group, $R_f^2$ represents a perfluorinated polyalkyleneoxy group consisting of perfluorinated alkyleneoxy groups having 1, 2, 3 or 4 carbon atoms or a mixture of such perfluorinated alkylene oxy groups, $R^3_f$ represents a perfluorinated alkylene group and q is 0 or 1. The perfluorinated alkyl group $R^1_f$ in formula (II) may be linear or branched and may comprise 1 to 10 carbon atoms, preferably 1 to 6 carbon atoms. A typical perfluorinated alkyl group is $CF_3\text{---}CF_2\text{---}CF_2\text{---}$. $R^3_f$ is a linear or branched perfluorinated alkylene group that will typically have 1 to 6 carbon atoms. For example, $R^3_f$ is $\text{---}CF_2\text{---}$ or $\text{---}CF(CF_3)\text{---}$. Examples of perfluoroalkylene oxy groups of perfluorinated polyalkyleneoxy group $R^2_f$ include:

- $\text{---}CF_2\text{---}CF_2\text{---}O\text{---}$,
- $\text{---}CF(CF_3)\text{---}CF_2\text{---}O\text{---}$,
- $\text{---}CF_2\text{---}CF(CF_3)\text{---}O\text{---}$,
- $\text{---}CF_2\text{---}CF_2\text{---}CF_2\text{---}O\text{---}$,
- $\text{---}CF_2\text{---}O\text{---}$,
- $\text{---}CF(CF_3)\text{---}O\text{---}$, and
- $\text{---}CF_2\text{---}CF_2\text{---}CF_2\text{---}CF_2\text{---}O$.

The perfluoroalkyleneoxy group may be comprised of the same perfluoroalkylene oxy units or of a mixture of different perfluoroalkylene oxy units. When the perfluoroalkyleneoxy group is composed of different perfluoroalkylene oxy units, they can be present in a random configuration, alternating configuration or they can be present as blocks. Typical examples of perfluorinated polyalkylene oxy groups include:
$\text{---}[CF_2\text{---}CF_2\text{---}O]_i\text{---}$; $\text{---}[CF(CF_3)\text{---}CF_2\text{---}O]_n\text{---}$; $\text{---}[CF_2CF_2\text{---}O]_i\text{---}[CF_2O]_j\text{---}$ and $\text{---}[CF_2\text{---}CF_2\text{---}O]_l\text{---}[CF(CF_3)\text{---}CF_2\text{---}O]_m\text{---}$; wherein r is an integer of 4 to 25, n is an integer of 3 to 25 and i, l, m and j each are integers of 2 to 25. A preferred perfluorinated polyether group that corresponds to formula (II) is $CF_3\text{---}CF_2\text{---}CF_2\text{---}O\text{---}[CF(CF_3)\text{---}CF_2O]_n\text{---}CF(CF_3)\text{---}$ wherein n is an integer of 3 to 25. This perfluorinated polyether group has a molecular weight of 783 when n equals 3 and can be derived from an oligomerization of hexafluoropropylene oxide. Such perfluorinated polyether groups are preferred in particular because of their benign environmental properties.

Examples of linking groups Q include organic groups that comprise aromatic or aliphatic groups that may be interrupted by O, N or S and that may be substituted, alkylene groups, oxy groups, thio groups, urethane groups, carboxy groups, carbonyl groups, amido groups, oxyalkylene groups, thioalkylene groups, carboxyalkylene and/or an amidoalkylene groups. Examples of functional groups T include thiol, hydroxy and amino groups.

In a particular embodiment, the fluorinated polyether corresponds to the following formula (III):

$$R_f^1\text{---}[CF(CF_3)\text{---}CF_2O]_n\text{---}CF(CF_3)\text{-}A\text{-}Q^1\text{-}T_k \qquad (III)$$

wherein $R_f^1$ represents a perfluorinated alkyl group, e.g., a linear or branched perfluorinated alkyl group having 1 to 6 carbon atoms, n is an integer of 3 to 25, A is a carbonyl group or $CH_2$, $Q^1$ is a chemical bond or an organic divalent or trivalent linking group for example as mentioned for the linking group Q above, k is 1 or 2 and T represents an isocyanate reactive group and each T may be the same or different. Particularly preferred compounds are those in which $R^1_f$ represents $CF_3CF_2CF_2\text{---}$. In accordance with a particular embodiment, the moiety -A-$Q^1$-$T_k$ is a moiety of the formula $\text{---}CO\text{---}X\text{---}R^a(OH)_k$ wherein k is 1 or 2, X is O or $NR^b$ with $R^b$ representing hydrogen or an alkyl group of 1 to 4 carbon atoms, and $R^a$ is an alkylene of 1 to 15 carbon atoms.

Representative examples of the moiety -A-$Q^1$-$T_k$ in above formula (III) include:

1. $\text{---}CONR^c\text{---}CH_2CHOHCH_2OH$ wherein $R^c$ is hydrogen or an alkyl group of for example 1 to 4 carbon atoms;
2. $\text{---}CONH\text{-}1,4\text{-dihydroxyphenyl}$;
3. $\text{---}CH_2OCH_2CHOHCH_2OH$;
4. $\text{---}COOCH_2CHOHCH_2OH$; and
5. $\text{---}CONR^d\text{---}(CH_2)_mOH$
   where $R^d$ is hydrogen or an alkyl group of 1 to 6 carbons and m is 2, 3, 4, 6, 8, 10 or 11.

Compounds according to formula (III) can for example be obtained by oligomerization of hexafluoropropylene oxide which results in a perfluoropolyether carbonyl fluoride. This carbonyl fluoride may be converted into an acid, ester or alcohol by reactions well known to those skilled in the art. The carbonyl fluoride or acid, ester or alcohol derived therefrom may then be reacted further to introduce the desired isocyanate reactive groups according to known procedures. For example, EP 870 778 describes suitable methods to produce compounds according to formula (III) having desired moieties -A-$Q^1$-$T_k$. Compounds having group 1 listed above can be obtained by reacting the methyl ester derivative of a fluorinated polyether with 3-amino-2-hydroxy-propanol. Compounds having the group 5 listed above can be obtained in a similar way by reacting with an amino-alcohol that has only one hydroxy function. For example 2-aminoethanol would yield a compound having the group 5 listed above with $R^d$ being hydrogen and m being 2.

Still further examples of compounds according to above formula (I) are disclosed in EP 870 778 or U.S. Pat. No. 3,536,710.

It will be evident to one skilled in the art that a mixture of fluorinated polyethers according to formula (I) may be used to prepare the fluorinated polyether compound of the fluorochemical composition. Generally, the method of making the fluorinated polyether according to formula (I) will result in a mixture of fluorinated polyethers that have different molecular weights and such a mixture can be used as such to prepare the fluorochemical component of the fluorochemical composition. In a preferred embodiment, such a mixture of fluorinated polyether compounds according to formula (I) is free of fluorinated polyether compounds having a perfluorinated polyether moiety having a molecular weight of less than 750 g/mol or alternatively the mixture contains fluorinated polyether compounds having a perfluorinated polyether moiety having a molecular weight of less than 750 g/mol in an amount of not more than 10% by weight relative to total weight of fluorinated polyether compounds, preferably not more than 5% by weight and most preferably not more than 1% by weight.

The isocyanate component for making the fluorinated compound of the fluorochemical composition is selected from a polyisocyanate having at least 3 isocyanate groups or a mixture of polyisocyanate compounds that on average has more than 2 isocyanate groups per molecule such as for example a mixture of a diisocyanate compound and a polyisocyanate compound having 3 or more isocyanate groups.

The polyisocyanate compound may be aliphatic or aromatic and is conveniently a non-fluorinated compound. Generally, the molecular weight of the polyisocyanate compound will be not more than 1500 g/mol. Examples include hexamethylenediisocyanate, 2,2,4-trimethyl-1,6-hexamethylenediisocyanate, and 1,2-ethylenediisocyanate, dicyclohexylmethane-4,4'-diisocyanate, aliphatic triisocyanates such as 1,3,6-hexamethylenetriisocyanate, cyclic trimer of hexamethylenediisocyanate and cyclic trimer of isophorone diisocyanate (isocyanurates); aromatic polyisocyanate such as 4,4'-methylenediphenylenediisocyanate, 4,6-di-(trifluoromethyl)-1,3-benzene diisocyanate, 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,5'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate and aromatic triisocyanates such as polymethylenepolyphenylisocyanate. Still further isocyanates that can be used for preparing the fluorinated compound include alicyclic diisocyanates such as 3-isocyanatomethyl-3,5,5-trimethylcyclohexylisocyanate; aromatic tri-isocyanates such as polymethylenepolyphenylisocyanate (PAPI); cyclic diisocyanates such as isophorone diisocyanate (IPDI). Also useful are isocyanates containing internal isocyanate-derived moieties such as biuret-containing tri-isocyanates such as that available from Bayer as DESMODUR™ N-100, isocyanurate-containing tri-isocyanates such as that available from Huls AG, Germany, as IPDI-1890, and azetedinedione-containing diisocyanates such as that available from Bayer as DESMODUR™ TT. Also, other di- or tri-isocyanates such as those available from Bayer as DESMODUR™ L and DESMODUR™ W, tri-(4-isocyanatophenyl)-methane (available from Bayer as DESMODUR™ R) and DDI 1410 (available from Henkel) are suitable.

The optional coreactant typically comprises water or a non-fluorinated organic compound having one or more zerewitinoff hydrogen atoms. Examples include non-fluorinated organic compounds that have at least one or two functional groups that are capable of reacting with an isocyanate group. Such functional groups include hydroxy, amino and thiol groups. Examples of such organic compounds include aliphatic monofunctional alcohols, e.g., mono-alkanols having at least 1, preferably at least 6 carbon atoms, aliphatic monofunctional amines, a polyoxyalkylenes having 2, 3 or 4 carbon atoms in the oxyalkylene groups and having 1 or 2 groups having at least one zerewitinoff hydrogen atom, polyols including diols such as polyether diols, e.g., polytetramethylene glycol, polyester diols, dimer diols, fatty acid ester diols, polysiloxane diols and alkane diols such as ethylene glycol and polyamines.

Examples of monofunctional alcohols include methanol, ethanol, n-propyl alcohol, isopropyl alcohol, n-butyl alcohol, isobutyl alcohol, t-butyl alcohol, n-amyl alcohol, t-amyl alcohol, 2-ethylhexanol, glycidol and (iso)stearylalcohol.

Fatty ester diols are preferably diols that include an ester function derived from a fatty acid, preferably a fatty acid having at least 5 carbon atoms and more preferably at least 8 carbon atoms. Examples of fatty ester diols include glycerol mono-oleate, glycerol mono-stearate, glycerol mono-ricinoleate, glycerol mono-tallow, long chain alkyl di-esters of pentaerythritol having at least 5 carbon atoms in the alkyl group. Suitable fatty ester diols are commercially available under the brand RILANIT® from Henkel and examples include RILANIT® GMS, RILANIT® GMRO and RILANIT® HE.

Polysiloxane diols include polydialkylsiloxane diols and polyalkylarylsiloxane diols. The polymerization degree of the polysiloxane diol is preferably between 10 and 50 and more preferably between 10 and 30. Polysiloxane diols particularly include those that correspond to one of the following two formulas:

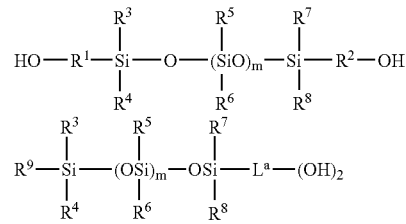

wherein $R^1$ and $R^2$ independently represent an alkylene having 1 to 4 carbon atoms, $R^3$, $R^4$, $R^5$, $R^6$, $R^7$, $R^8$ and $R^9$ independently represent an alkyl group having 1 to 4 carbon atoms or an aryl group, $L^a$ represents a trivalent linking group and m represents a value of 10 to 50. L is for example a linear or branched alkylene that may contain one or more catenary hetero atoms such as oxygen or nitrogen.

Further suitable diols include polyester diols. Examples include linear polyesters available under the brand UNIFLEX™ from Union Camp and polyesters derived from dimer acids or dimer diols. Dimer acids and dimer diols are well-known and are obtained by dimerisation of unsaturated acids or diols in particular of unsaturated long chain aliphatic acids or diols (e.g. at least 5 carbon atoms). Examples of polyesters obtainable from dimer acids and/or dimer diols are those available under the brand PRIPLAST from Uniqema, Gouda, Netherlands.

Dimer diols include those that are commercially available from Uniqema under the brand PRIPOL™ which are believed to have been obtained from dimerisation of unsaturated diols in particular of unsaturated long chain aliphatic diols (e.g., at least 5 carbon atoms).

According to a particularly preferred embodiment, the organic compound will include one or more water solubilising groups or groups capable of forming water solubilising groups so as to obtain a fluorinated compound that can more easily be dispersed in water. Additionally, by including water solubilising groups in the fluorinated compound, beneficial stain release properties may be obtained on the fibrous substrate. Suitable water solubilising groups include cationic, anionic and zwitter ionic groups as well as non-ionic water solubilising groups. Examples of ionic water solubilising groups include ammonium groups, phosphonium groups, sulfonium groups, carboxylates, sulfonates, phosphates, phosphonates or phosphinates. Examples of groups capable of forming a water solubilising group in water include groups that have the potential of being protonated in water such as amino groups, in particular tertiary amino groups. Particularly preferred organic compounds are those organic compounds that have only one or two functional groups capable of reacting with NCO-group and that further include a non-ionic water-solubilizing group. Typical non-ionic water solubilizing groups include polyoxyalkylene groups. Preferred polyoxyalkylene groups include those having 1 to 4 carbon atoms such as polyoxyethylene, polyoxypropylene, polyoxytetramethylene and copolymers thereof such as polymers having both oxyethylene and oxypropylene units. The polyoxyalkylene containing organic compound may include one or two functional groups such as hydroxy or amino groups. Examples of polyoxyalkylene containing compounds include alkyl ethers of polyglycols such as e.g. methyl or ethyl ether of polyethyleneglycol, hydroxy terminated methyl or ethyl ether of a random or block copolymer of ethyleneoxide and propyleneoxide, amino terminated methyl or ethyl ether of polyethyleneoxide, polyethylene glycol, polypropylene glycol, a hydroxy terminated copolymer (including a block copolymer) of ethyleneoxide and propylene oxide, a diamino terminated poly(alkylene oxide) such as JEFFAMINE™ ED, JEFFAMINE™ EDR-148 and poly(oxyalkylene) thiols.

Still further, the optional co-reactant may include an isocyanate blocking agent. The isocyanate blocking agent can be used alone or in combination with one or more other co-reactants described above. Isocyanate blocking agents are compounds that upon reaction with an isocyanate group yield a group that is unreactive at room temperature with compounds that at room temperature normally react with an isocyanate but which group at elevated temperature reacts with isocyanate reactive compounds. Generally, at elevated temperature the blocking group will be released from the blocked (poly)isocyanate compound thereby generating the isocyanate group again which can then react with an isocyanate reactive group. Blocking agents and their mechanisms have been described in detail in "Blocked isocyanates III.: Part. A, Mechanisms and chemistry" by Douglas Wicks and Zeno W. Wicks Jr., Progress in Organic Coatings, 36 (1999), pp. 14-172.

Preferred blocking agents include arylalcohols such as phenols, lactams such as ε-caprolactam, δ-valerolactam, γ-butyrolactam, oximes such as formaldoxime, acetaldoxime, cyclohexanone oxime, acetophenone oxime, benzophenone oxime, 2-butanone oxime or diethyl glyoxime. Further suitable blocking agents include bisulfite and triazoles.

In accordance with a particular embodiment, a perfluoroaliphatic group may be included in the fluorinated compound and the co-reactant may then comprise a perfluoroaliphatic compound having one or more isocyanate reactive groups. By "perfluoroaliphatic groups" is meant groups that consist of carbon and fluorine without however including perfluorinated end groups of the perfluorinated moiety. The perfluoroaliphatic group contains 3 to 18 carbon atoms but preferably has 3 to 6 carbon atoms, in particular a $C_4F_9$— group. By including perfluoroaliphatic groups, in particular $C_4F_9$— groups in the fluorinated polyether compound, one can improve the solubility and/or dispersibility of the fluorinated polyether compound in the fluorochemical composition. Preferred fluorinated co-reactants will correspond to the formula:

$$(R_f^4)_x\text{-L-Y} \qquad (IV)$$

wherein $R_f^4$ represents a perfluoroaliphatic group having 3 to 5 or 6 carbon atoms, L represents a non-fluorinated organic divalent or multi-valent linking group such as for example organic groups that comprise alkylene, carboxy, sulfonamido, carbonamido, oxy, alkyleneoxy, thio, alkylenethio and/or arylene. Y represents a functional group having a Zerewitinoff hydrogen such as for example hydroxy, amino or thiol and x is an integer of 1 to 20, for example between 2 and 10. According to a particular embodiment, $R_f^4$ is $C_4F_9$— and x is 1.

Compounds according to formula (IV) in which x is 2 or more can be conveniently prepared through the polymerization of a perfluoroaliphatic compound having a polymerizable group in the presence of a functionalized chain transfer agent. Examples of such polymerizable perfluoroaliphatic compounds include those according to the formula:

$$R_f^4\text{-}Q^3\text{-}C(R^e)=CH_2 \qquad (V)$$

wherein $R_f^4$ is a perfluoroaliphatic group of 3 to 5 or 6 carbon atoms, preferably $C_4F_9$—, $R^e$ is hydrogen or a lower alkyl of 1 to 4 carbon atoms and $Q^3$ represents a non-fluorinated organic divalent linking group. The linking group $Q^3$ links the perfluoroaliphatic group to the free radical polymerizable group. Linking group $Q^3$ is generally non-fluorinated and preferably contains from 1 to about 20 carbon atoms. $Q^3$ can optionally contain oxygen, nitrogen, or sulfur-containing groups or a combination thereof, and $Q^3$ is free of functional groups that substantially interfere with free-radical polymerization (e.g., polymerizable olefinic double bonds, thiols, and other such functionality known to those skilled in the art). Examples of suitable linking groups $Q^3$ include straight chain, branched chain or cyclic alkylene, arylene, aralkylene, sulfonyl, sulfoxy, sulfonamido, carbonamido, carbonyloxy, urethanylene, ureylene, and combinations thereof such as sulfonamidoalkylene.

Specific examples of fluorinated aliphatic group containing monomers include:
$CF_3CF_2CF_2CF_2CH_2CH_2OCOCR^d=CH_2$;
$CF_3(CF_2)_3CH_2OCOCR^d=CH_2$;
$CF_3(CF_2)_3SO_2N(CH_3)CH_2CH_2OCOCR^d=CH_2$;
$CF_3(CF_2)_3SO_2N(C_2H_5)CH_2CH_2OCOCR^d=CH_2$;
$CF_3(CF_2)_3SO_2N(CH_3)CH_2CH(CH_3)OCOCR^d=CH_2$;
$(CF_3)_2CFCF_2SO_2N(CH_3)CH_2CH_2OCOCR^d=CH_2$; and
$C_6F_{13}C_2H_4OOC—CR^d=CH_2$ wherein $R^d$ is hydrogen or methyl.

Examples of suitable chain transfer agents include compounds that have the general formula:

$$HS—R^h\text{-}A \qquad (VI)$$

wherein $R^h$ represents a non-fluorinated organic divalent linking group or a chemical bond and A represents a functional group that has a Zerewitinoff hydrogen atom, Examples of functional groups A include amino groups, hydroxy and acid groups. Specific examples of functional chain transfer agents include 2-mercaptoethanol, mercaptoacetic acid, 2-mercaptobenzoic acid, 3-mercapto-2-butanol, 2-mercaptosulfonic acid, 2-mercaptoethylsulfide, 2-mercaptonicotinic acid, 4-hydroxythiophenol, 3-mercapto-1,2-propanediol, 1-mercapto-2-propanol, 2-mercaptopropionic acid, N-(2-mercaptopropionyl)glycine, 2-mercaptopyridinol, mercaptosuccinic acid, 2,3-dimercaptopropanesulfonic acid, 2,3-dimercaptopropanol, 2,3-dimercaptosuccinic acid, 2,5-dimercapto-1,3,4-thiadiazole, 3,4-toluenedithiol, o-, m-, and p-thiocresol, 2-mercaptoethylamine, ethylcyclohexanedithiol, p-menthane-2,9-dithiol and 1,2-ethanedithiol. Preferred functionalized end-capping agents include 2-mercaptoethanol, 3-mercapto-1,2-propanediol, 4-mercaptobutanol, 11-mercaptoundecanol, mercaptoacetic acid, 3-mercaptopropionic acid, 12-mercaptododecanoic acid, 2-mercaptoethylamine, 1-chloro-6-mercapto-4-oxahexan-2-ol, 2,3-dimercaptosuccinic acid, 2,3-dimercaptopropanol, 3-mercaptopropyltrimethoxysilane, 2-chloroethanethiol, 2-amino-3-mercaptopropionic acid, and compounds such as the adduct of 2-mercaptoethylamine and caprolactam.

Specific examples of perfluoroaliphatic coreactants include:

$C_4F_9$—$SO_2NR$—$CH_2CH_2OH$;
$C_4F_9$—$SO_2NR$—$CH_2CH_2$—$O$—$[CH_2CH_2O]_tOH$
wherein t is 1 to 5;
$C_4F_9SO_2NRCH_2CH_2CH_2NH_2$;
$C_4F_9$—$SO_2NR$—$CH_2CH_2SH$;
$C_4F_9$—$SO_2N$—$(CH_2CH_2OH)_2$; and
$C_4F_9$—$SO_2NR$—$CH_2CH_2O(CH_2)_sOH$ wherein s is 2, 3, 4, 6, 8, 10 or 11 wherein R is hydrogen or a lower alkyl of 1 to 4 carbons such as methyl, ethyl and propyl.

The condensation reaction to prepare the fluorinated compound of the fluorochemical composition can be carried out under conventional conditions well-known to those skilled in the art. Preferably the reaction is run in the presence of a catalyst and typically, the reaction will be carried out such that all isocyanate groups have been reacted and the obtained reaction product is free of isocyanate groups. Suitable catalysts include tin salts such as dibutyltin dilaurate, stannous octanoate, stannous oleate, tin dibutyldi-(2-ethyl hexanoate), stannous chloride; and others known to those skilled in the art. The amount of catalyst present will depend on the particular reaction, and thus it is not practical to recite particular preferred concentrations. Generally, however, suitable catalyst concentrations are from about 0.001 percent to about 10 percent, preferably about 0.1 percent to about 5 percent, by weight based on the total weight of the reactants.

The condensation reaction is preferably carried out under dry conditions in a common organic solvent that does not contain Zerewitinoff hydrogens such as ethyl acetate, acetone, methyl isobutyl ketone, toluene and fluorinated solvents such hydrofluoroethers and trifluorotoluene. Suitable reaction temperatures will be easily determined by those skilled in the art based on the particular reagents, solvents, and catalysts being used. While it is not practical to enumerate particular temperatures suitable for all situations, generally suitable temperatures are between about room temperature and about 120° C.

Generally the reaction is carried out such that between 1 and 100% of the isocyanate groups of the polyisocyanate compound or mixture of polyisocyanate compounds is reacted with the perfluorinated polyether compound according to formula (I). Preferably between 5 and 60% and more preferably 10% to 50% of the isocyanate groups is reacted with the perfluorinated polyether compound and the remainder is reacted with one or more co-reactants as described above. An especially preferred fluorinated compound is obtained by reacting 10 to 30% of the isocyanate groups with the perfluorinated polyether compound according to formula (I), between 90 and 30% of the isocyanate groups with an isocyanate blocking agent and between 0 and 40% of the isocyanate groups with water or a non-fluorinated organic compound other than an isocyanate blocking agent.

The fluorinated compound of the fluorochemical composition typically will have a molecular weight such that it is readily dissolved or dispersed in water or an organic solvent. Generally, the molecular weight of the fluorinated compound is not more than 100,000 g/mol, preferably not more than 50,000 g/mol with a typical range being between 1500 g/mol and 15,000 g/mol or between 1500 g/mol and 5,000 g/mol. When a mixture of fluorinated compounds is used, the aforementioned molecular weights represent weight average molecular weights.

The fluorochemical composition comprises a dispersion or solution of the fluorinated compound in water or an organic solvent. The term "dispersion" in connection with this invention includes dispersions of a solid in a liquid as well as liquid in liquid dispersions, which are also called emulsions. Generally, the amount of fluorinated compound contained in the treating composition is between 0.01 and 4% by weight, preferably between 0.05 and 3% by weight based on the total weight of the fluorochemical composition. Higher amounts of fluorinated compound of more than 4% by weight, for example up to 10% by weight may be used as well, particularly if the uptake of the fluorochemical composition by the substrate is low. Generally, the fluorochemical treating composition will be prepared by diluting a more concentrated fluorochemical composition to the desired level of fluorinated compound in the treating composition. The concentrated fluorochemical composition can contain the fluorinated compound in an amount of up to 70% by weight, typically between 10% by weight and 50% by weight.

When the fluorochemical composition is in the form of a dispersion in water or an organic solvent, the weight average particle size of the fluorinated compound particles is preferably not more than 400 nm, more preferably is not more than 300 nm.

Most preferably, the fluorochemical composition is an aqueous dispersion of the fluorinated compound. Such dispersion may be non-ionic, anionic, cationic or zwitterionic. The dispersion is preferably stabilised using non-fluorinated surfactants, such as non-ionic polyoxyalkylene, in particular polyoxyethylene surfactants, anionic non-fluorinated surfactants, cationic non-fluorinated surfactants and zwitterionic non-fluorinated surfactants. Specific examples of non-fluorinated surfactants that can be used are nonionic types such as EMULSOGEN™ EPN 207 (Clariant) and TWEEN™ 80 (ICI), anionic types such as lauryl sulfate and sodium dodecyl benzene sulfonate, cationic types such as ARQUAD™ T-50 (Akzo), ETHOQUAD™ 18-25 (Akzo) or amphoteric types such as lauryl amineoxide and cocamido propyl betaine. The non-fluorinated surfactant is preferably present in an amount of about 1 to about 25 parts by weight, preferably about 2 to about 10 parts by weight, based on 100 parts by weight of the fluorochemical composition.

Alternatively, a solution or dispersion of the fluorinated compound in an organic solvent can be used as the fluorochemical treating composition. Suitable organic solvents include alcohols such as isopropanol, methoxy propanol and t.butanol, ketones such as isobutyl methyl ketone and methyl ethylketone, ethers such as isoptopylether, esters such ethylacetate, butylacetate or methoxypropanol acetate or (partially) fluorinated solvents such as HCFC-141b, HFC-4310mee and hydrofluoroethers such as HFE-7100 or HEM-7200 available from 3M Company.

The fluorochemical composition may contain further additives such as buffering agent, agents to impart fire proofing or antistatic properties, fungicidal agents, optical bleaching agents, sequestering agents, mineral salts and swelling agents to promote penetration. In a particular embodiment, the fluorochemical composition may contain additionally a non-fluorinated organic compound, wherein the non-fluorinated organic compound is capable of improving relative to the fluorochemical composition without the non-fluorinated organic compound, the oil repellency or water repellency that can be achieved by the fluorochemical composition on a fibrous substrate or the durability of one or both of the repellency properties. Such non-fluorinated organic compounds are sometimes called extenders. Suitable extenders for use in the fluorochemical composition include non-fluorinated organic compounds that have one or more blocked isocyanate groups, so called blocked isocyanate compounds, or a carbodiimide compound. Preferred blocked isocyanate extenders are blocked polyisocyanates that at a temperature of less than 150° C. are capable of reacting with an isocyanate reactive group, preferably through deblocking of the blocking agent at elevated temperature. Preferred blocking agents include arylalcohols such as phenols, lactams such as ε-caprolactam, δ-valerolactam, γ-butyrolactam, oximes such as formaldoxime, acetaldoxime, methyl ethyl ketone oxime, cyclohexanone oxime, acetophenone oxime, benzophenone oxime, 2-butanone oxime or diethyl glyoxime. Further suitable blocking agents include bisulfite and triazoles.

According to a particular embodiment of the invention, the blocked polyisocyanate may comprise the condensation product of a polyisocyanate, for example a di- or triisocyanate, a blocking agent and a non-fluorinated organic compound other than the blocking agent and having one or more isocyanate reactive groups such as a hydroxy, amino or thiol group. Examples of such non-fluorinated organic compounds other than the blocking agent include those described above as optional co-reactant in the preparation of the fluorinated compound.

The carbodiimide compound can be an aromatic or aliphatic carbodiimide compound and may include a polycarbodiimide. Carbodiimides that can be used have been described in for example U.S. Pat. No. 4,668,726, U.S. Pat. No. 4,215,205, U.S. Pat. No. 4,024,178, U.S. Pat. No. 3,896, 251, WO 93/22282, U.S. Pat. No. 5,132,028, U.S. Pat. No. 5,817,249, U.S. Pat. No. 4,977,219, U.S. Pat. No. 4,587,301, U.S. Pat. No. 4,487,964, U.S. Pat. No. 3,755,242 and U.S. Pat. No. 3,450,562. Particularly suitable carbodiimides for use in this invention include those corresponding to the formula (VII):

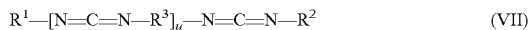

$$R^1-[N=C=N-R^3]_u-N=C=N-R^2 \quad (VII)$$

wherein u has a value of 1 to 20, typically 1 or 2, $R^1$ and $R^2$ each independently represent a hydrocarbon group, in particular a linear, branched or cyclic aliphatic group preferably having 6 to 18 carbon atoms and $R^3$ represents a divalent linear, branched or cyclic aliphatic group.

The aliphatic carbodiimide extenders of formula VII can be synthesized in a 1-step process by reacting aliphatic diisocyanates with an aliphatic mono-isocyanate as a chain terminator at 130 to 170° C. in the presence of a phospholine oxide or other suitable carbodiimide formation catalyst. Preferably the reaction is carried out in the absence of solvents under inert atmosphere, but high-boiling non-reactive solvents such as methyl isobutyl ketone can be added as diluents. The mole ratio of diisocyanate to mono-isocyanate can be varied from 0.5 to 10, preferably 1 to 5.

Examples of aliphatic diisocyanates for the preparation of the carbodiimide compounds of formula (VII) include isophorone diisocyanate, dimer diacid diisocyanate, 4,4' dicyclohexyl methane diisocyanate. Examples of mono-isocyanates are n.butyl isocyanate and octadecyl isocyanate. Representative examples of suitable carbodiimide formation catalysts are described in e.g.; U.S. Pat. No. 2,941,988, U.S. Pat. No. 3,862,989 and U.S. Pat. No. 3,896,251. Examples include 1-ethyl-3-phospholine, 1-ethyl-3-methyl-3-phospholine-1-oxide, 3-methyl-1-phenyl-3-phospholine-1-oxide and bicyclic terpene alkyl or hydrocarbyl aryl phosphine oxide. The particular amount of catalyst used depends on the reactivity of the catalyst and the isocyanates being used. A concentration of 0.2 to 5 parts of catalyst per 100 g of diisocyanate is suitable.

In an alternative approach the aliphatic diisocyanates can be first reacted with monofunctional alcohols, amines or thiols followed by carbodiimide formation in a second step.

The fluorochemical composition may contain also further fluorochemical compounds other than the fluorinated compound comprising the reaction product as described above. For example, the fluorochemical composition may contain fluorochemical compounds that are based on or derived from perfluoroaliphatic compounds. Nevertheless, it is not necessary to include such compounds in the fluorochemical composition. Also, if perfluoroaliphatic based compounds are included in the composition, they are preferably compounds based on short chain perfluoroaliphatics such as compounds containing $C_4F_9$— groups.

In a preferred embodiment of the present invention, the fluorochemical composition will be free of or substantially free of perfluorinated polyether moieties having a molecular weight of less than 750 g/mol and/or perfluoroaliphatic groups of more than 5 or 6 carbons. By the term "perfluoroaliphatic groups" is meant groups consisting of carbon and fluorine without including perfluorinated end groups of the perfluorinated polyether moieties. By the term "substantially free of" is meant that the particular perfluorinated polyether moieties are present in amounts of not more than 10% by weight, preferably not more than 5% by weight and most preferably not more than 1% by weight based on the total weight of perfluorinated polyether moieties in the composition and that the particular perfluoroaliphatic groups having more than 5 or 6 carbons are present in amounts of not more than 10% by weight, preferably not more than 5% by weight and most preferably not more than 1% by weight based on the total weight of perfluoroaliphatic groups in the composition. Compositions that are free of or substantially free of these moieties or groups are preferred because of their beneficial environmental properties.

In order to affect treatment of the fibrous substrate the fibrous substrate is contacted with the fluorochemical composition of the invention. For example, the substrate can be immersed in the fluorochemical treating composition. The treated substrate can then be run through a padder/roller to remove excess fluorochemical composition and dried. The treated substrate may be dried at room temperature by leaving it in air or may alternatively or additionally be subjected to a heat treatment, for example, in an oven. This heat treatment is typically carried out at temperatures between about 50° C. and about 190° C. depending on the particular system or application method used. In general, a temperature of about 120° C. to 170° C., in particular of about 150° C. to about 170° C. for a period of about 20 seconds to 10 minutes, preferably 3 to 5 minutes, is suitable. Alternatively, the chemical composition can be applied by spraying the composition on the fibrous substrate.

It was found that with fluorochemical compositions of this invention, good to excellent oil, water repellent properties and/or stain release properties on the fibrous substrate can be achieved. Moreover, these properties can be achieved without subjecting the fibrous substrate to a heat treatment (i.e., the properties can be achieved upon air drying the fibrous substrate after the application of the composition). Also, it was observed that the repellency properties are durable, i.e., even after several washing or dry cleaning cycles, the repellency properties can be substantially maintained. The compositions furthermore in many instances do not negatively affect the soft feel of the fibrous substrates or may even improve the soft feel of the fibrous substrate.

The amount of the treating composition applied to the fibrous substrate is chosen so that a sufficiently high level of the desired properties are imparted to the substrate surface preferably without substantially affecting the look and feel of the treated substrate. Such amount is usually such that the resulting amount of the fluoropolymer on the treated fibrous substrate will be between 0.05% and 3% by weight, preferably between 0.2 and 1% by weight based on the weight of the fibrous substrate. The amount which is sufficient to impart desired properties can be determined empirically and can be increased as necessary or desired. According to a particularly preferred embodiment, the treatment is carried out with a composition and under conditions such that the total amount of perfluorinated polyether groups having a molecular weight of less than 750 g/mol and/or perfluoroaliphatic groups of more than 6 carbon atoms is not more than 0.1%, preferably not more than 0.05% by weight based on the weight of the fibrous substrate.

Fibrous substrates that can be treated with the fluorochemical composition include in particular textile and carpet. The fibrous substrate may be based on synthetic fibers, e.g., polyester, polyamide and polyacrylate fibers or natural fibers, e.g., cellulose fibers as well as mixtures thereof. The fibrous substrate may be a woven as well as a non-woven substrate.

The stain-release properties may be enhanced by the addition of a stain-release composition. The term "stain release" used herein refers to the property of ready release of stains that have been absorbed by fibrous materials or leather. The ratio of the stain release compound(s) to the repellent compound(s) may comprise from about 10:90 to 90:10 weight percent. The individual components (A) and (B) can be prepared as solvent solution, blended and then emulsified, or separately prepared emulsions may be blended. The separately prepared solvent solutions or emulsions maybe concentrated solutions of emulsions, that may be subsequently diluted to preferred concentrations prior to use.

The stain release composition is advantageously a fluorochemical urethane stain release composition such as is described in U.S. Pat. No. 6,646,088 (Fan et al.), incorporated herein by reference. These comprise one or more urethane oligomers of at least two repeating units selected from the group consisting of fluorine-containing urethane oligomers and long-chain hydrocarbon-containing urethane oligomers. These urethane oligomers comprise the reaction product of (a) one or more polyfunctional isocyanate compounds; (b) one or more polyols; (c) one or more monoalcohols selected from the group consisting of fluorochemical monoalcohols, optionally substituted long-chain hydrocarbon monoalcohols, and mixtures thereof; (d) one or more silanes; and optionally (e) one or more water-solubilizing compounds comprising one or more water-solubilizing groups and at least one isocyanate-reactive hydrogen containing group.

Preferred classes of urethane oligomers that may be present are represented by the following formulas (III) through (VI):

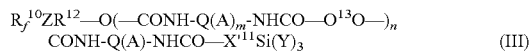

(III)

(IV)

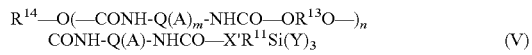

(V)

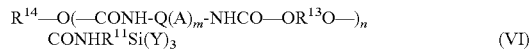

(VI)

wherein:

$R_f^{10}ZR^{12}$— is a residue of at least one of the fluorochemical monoalcohols;

$R_f^{10}$ is a perfluoroalkyl group having 3 to about 8 carbon atoms, or a perfluoroheteroalkyl group having 3 to about 50 carbon atoms;

Z is a covalent bond, sulfonamido (—SO$_2$NR—), or carboxamido (—CONR—) where R is hydrogen or alkyl;

$R^{11}$ is an alkylene, heteroalkylene, aralkylene, or heteroaralkylene group;

$R^{12}$ is a divalent straight- or branched-chain alkylene, cycloalkylene, or heteroalkylene group of 1 to 14 carbon atoms, preferably 1 to 8 carbon atoms, more preferably 1 to 4 carbon atoms, and most preferably two carbon atoms, and preferably $R^2$ is alkylene or heteroalkylene of 1 to 14 carbon atoms;

Q is a multi-valent organic group which is a residue of the polyfunctional isocyanate compound;

$R^{13}$ is a divalent organic group which is a residue of the polyol and may be substituted with or contain (i) water-solubilizing groups selected from the group consisting of carboxylate, sulfate, sulfonate, phosphonate, ammonium, quaternary ammonium, and mixtures thereof and (ii) perfluorinated groups;

X' is —O—, —S—, or —N(R)—, wherein R is hydrogen or alkyl;

$R^{14}$ is an optionally substituted long-chain hydrocarbon derived from the long-chain hydrocarbon monoalcohol;

each Y is independently a hydroxy; a hydrolyzable moiety selected from the group consisting of alkoxy, acyloxy, heteroalkoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety.

A is selected from the group consisting of $R_f^{10}ZR^{12}$—OCONH—, (Y)$_3$SiR$^{11}$XCONH—, (Y)$_3$SiR$^{11}$NHCOOR$^{13}$OCONH—, and W—CONH—, wherein W is a residue of the water-solubilizing compound comprising one or more water-solubilizing groups;

m is an integer from 0 to 2; and n, which is the number of repeating units, is an integer from 2 to 10.

The polisocyanate component of the stain release composition may be selected from those previously described. Preferred polyisocyanates, in general, include those selected from the group consisting of hexamethylene 1,6-diisocyanate (HDI), 1,12-dodecane diisocyanate isophorone diisocyanate, toluene diisocyanate, dicyclohexylmethane 4,4'-diisocyanate, MDI, derivatives of all the aforementioned, including DESMODUR™ N-100, N-3200, N-3300, N-3400, N-3600, and mixtures thereof.

Polyols suitable for use in preparing the chemical compositions of the present invention include those organic polyols that have an average hydroxyl functionality of at least about 2 (preferably, about 2 to 5; more preferably, about 2 to 3; most preferably, about 2, as diols are most preferred). The hydroxyl groups can be primary or secondary, with primary hydroxyl groups being preferred for their greater reactivity. Mixtures of diols with polyols that have an average hydroxyl functionality of about 2.5 to 5 (preferably about 3 to 4; more preferably, about 3) can also be used. It is preferred that such mixtures contain no more than about 20 percent by weight of such polyols, more preferably no more than about 10 percent, and most preferably no more than about 5 percent. Preferred mixtures are mixtures of diols and triols.

Suitable polyols include those that comprise at least one aliphatic, heteroaliphatic, alicyclic, heteroalicyclic, aromatic, heteroaromatic, or polymeric moiety. Preferred polyols are aliphatic or polymeric polyols that contain hydroxyl groups as terminal groups or as groups that are pendant from the backbone chain of the polyol.

The molecular weight (that is, the number average molecular weight) of hydrocarbon polyols can generally vary from about 60 to about 2000, preferably, from about 60 to about 1000, more preferably, from about 60 to about 500, most preferably, from about 60 to about 300. The equivalent weight (that is, the number average equivalent weight) of hydrocarbon polyols generally can be in the range of about 30 to about 1000, preferably, from about 30 to about 500, more preferably, from about 30 to about 250. Polyols of higher equivalent weight can have a tendency to reduce the stain-release properties provided by the chemical compositions of the present invention unless the polyol contains an $R_f$ group or the polyol comprises a perfluoropolyether. If the polyol comprises a perfluoropolyether, it can have a molecular weight as high as approximately 7000 and can still provide adequate stain-release properties.

When the polyols of the present invention are diols, the diols can be substituted with or contain other groups. Thus, a preferred diol is selected from the group consisting of a branched- or straight-chain hydrocarbon diol, a diol containing at least one solubilizing group, a fluorinated diol comprising a monovalent or divalent perfluorinated group, a diol comprising a silane group, a polyalkylsiloxane diol, a polyarylsiloxane diol, and mixtures thereof. Solubilizing groups include carboxylate, sulfate, sulfonate, phosphate, phosphonate, ammonium, quaternary ammonium, and the like.

Perfluorinated monovalent groups ($R_f$) may be perfluoroalkyl and perfluoroheteroalkyl, and perfluorinated divalent groups may be perfluoroalkylene and perfluoroheteroalkylene. Perfluoroalkyl groups are preferred, with perfluoroalkyl groups having from 2 to 6 carbon atoms being more preferred and perfluoroalkyl groups having 4 carbon atoms being most preferred. Another embodiment comprises perfluoroheteroalkyl groups having 6 to 50 carbon atoms. Perfluorinated divalent groups are preferably perfluoroheteroalkylene groups. Perfluoroheteroalkylene groups are preferably perfluoropolyether groups having from about 3 to about 50 carbon atoms.

The silane groups of the diol may contain one, two, or three hydrolyzable groups on the silicon atom. Hydrolyzable groups are as defined below. Polyalkylsiloxane diols include, but are not limited to, hydroxyalkyl terminated polydimethyl siloxanes, polymethyloctadecylsiloxane, polydimethylmethyloctadecylsiloxane, polydimethyldodecyltetradecylsiloxane, polymethylhexadecylsiloxane, polymethyloctylsiloxane, polymethyl-3,3,3-trifluoropropylsiloxane, and the like. Polyarylsiloxane diols are essentially the same as the polyalkylsiloxanes with some or all of the methyl groups replaced with phenyl groups, such as hydroxyalkyl terminated polydiphenylsiloxane and hydroxyalkyl terminated dimethyl-diphenylsiloxane copolymer.

Representative examples of suitable non-polymeric polyols include alkylene glycols, polyhydroxyalkanes, and other polyhydroxy compounds. The alkylene glycols include, for example, 1,2-ethanediol; 1,2-propanediol; 3-chloro-1,2-propanediol; 1,3-propanediol; 1,3-butanediol; 1,4-butanediol; 2-methyl-1,3-propanediol; 2,2-dimethyl-1,3-propanediol (neopentylglycol); 2-ethyl-1,3-propanediol; 2,2-diethyl-1,3-propanediol; 1,5-pentanediol; 2-ethyl-1,3-pentanediol; 2,2,4-trimethyl-1,3-pentanediol; 3-methyl-1,5-pentanediol; 1,2-, 1,5-, and 1,6-hexanediol; 2-ethyl-1,6-hexanediol; bis(hydroxymethyl)cyclohexane; 1,8-octanediol; bicyclo-octanediol; 1,10-decanediol; tricyclo-decanediol; norbornanediol; and 1,18-dihydroxyoctadecane.

The polyhydroxyalkanes include, for example, glycerine; trimethylolethane; trimethylolpropane; 2-ethyl-2-(hydroxymethyl)-1,3-propanediol; 1,2,6-hexanetriol; pentaerythritol; quinitol; mannitol; and sorbitol.

The other polyhydroxy compounds include, for example, such as di(ethylene glycol); tri(ethylene glycol); tetra(ethylene glycol); tetramethylene glycol; dipropylene glycol; diisopropylene glycol; tripropylene glycol; bis(hydroxymethyl) propionic acid; N,N-bis(2-hydroxyethyl)-3-aminopropyltriethoxysilane; bicine; N-bis(2-hydroxyethyl) perfluorobutylsulfonamide; 1,11-(3,6-dioxaundecane)diol; 1,14-(3,6,9,12-tetraoxatetradecane)diol; 1,8-(3,6-dioxa-2,5,8-trimethyloctane)diol; 1,14-(5,10-dioxatetradecane)diol; castor oil; 2-butyne-1,4-diol; N,N-bis(hydroxyethyl)benzamide; 4,4'-bis(hydroxymethyl)diphenylsulfone; 1,4-benzenedimethanol; 1,3-bis(2-hydroxyethyoxy)benzene; 1,2-dihydroxybenzene; resorcinol; 1,4-dihydroxybenzene; 3,5-, 2,6-, 2,5-, and 2,4-dihydroxybenzoic acid; 1,6-, 2,6-, 2,5-, and 2,7-dihydroxynaphthalene; 2,2'- and 4,4'-biphenol; 1,8-dihydroxybiphenyl; 2,4-dihydroxy-6-methyl-pyrimidine; 4,6-dihydroxypyrimidine; 3,6-dihydroxypyridazine; bisphenol A; 4,4'-ethylidenebisphenol; 4,4'-isopropylidenebis(2,6-dimethylphenol); bis(4-hydroxyphenyl)methane; 1,1-bis(4-hydroxyphenyl)-1-phenylethane (bisphenol C); 1,4-bis(2-hydroxyethyl)piperazine; bis(4-hydroxyphenyl) ether; 1,4-bis (1-hydroxy-1,1-dihydroperfluoroethoxyethoxy)perfluoro-n-butane (HOCH$_2$CF$_2$OC$_2$F$_4$O(CF$_2$)$_4$OC$_2$F$_4$OCF$_2$CH$_2$OH); 1,4-bis(1-hydroxy-1,1-dihydroperfluoropropoxy)perfluoro-n-butane (HOCH$_2$CF$_2$CF$_2$O(CF$_2$)$_4$OCF$_2$CF$_2$CH$_2$OH); as well as other aliphatic, heteroaliphatic, saturated alicyclic, aromatic, saturated heteroalicyclic, and heteroaromatic polyols; and the like, and mixtures thereof.

Representative examples of useful polymeric polyols include polyoxyethylene, polyoxypropylene, and ethylene oxide-terminated polypropylene glycols and triols of molecular weights from about 200 to about 2000, corresponding to equivalent weights of about 100 to about 1000 for the diols or about 70 to about 700 for triols; polytetramethylene glycols of varying molecular weight; polydialkylsiloxane diols of varying molecular weight; hydroxy-terminated polyesters and hydroxy-terminated polylactones (e.g., polycaprolactone polyols); hydroxy-terminated polyalkadienes (e.g., hydroxyl-terminated polybutadienes); and the like. Mixtures of polymeric polyols can be used if desired.

Useful commercially available polymeric polyols include CARBOWAX™ poly(ethylene glycol) materials in the number average molecular weight ($M_n$) range of from about 200 to about 2000 (available from Union Carbide Corp., Danbury, Conn.); poly(propylene glycol) materials such as PPG-425 (available from Lyondell Chemical Company, Houston, Tex.); block copolymers of poly(ethylene glycol) and polypropylene glycol) such as PLURONIC™ L31 (available from BASF Corporation, Mount Olive, N.J.); fluorinated oxetane polyols made by the ring-opening polymerization of fluorinated oxetane such as POLY-3-FOX™ (available from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al); perfluoropolyether diols such as FOMBLIN™ ZDOL (HOCH$_2$CF$_2$O(CF$_2$O)$_{8-12}$ (CF$_2$CF$_2$O)$_{8-12}$CF$_2$CH$_2$OH, available from Ausimont, Inc., Thorofare, N.J.); Bisphenol A ethoxylate, Bisphenol A propyloxylate, and Bisphenol A propoxylate/ethoxylate (available from Sigma-Aldrich, Milwaukee, Wis.); polytetramethylene ether glycols such as POLYMEG™ 650 and 1000 (available from Quaker Oats Company, Chicago, Ill.) and the TERATHANE™ polyols (available from E.I. duPont de Nemours, filmgton, Del.); hydroxyl-terminated polybutadiene resins such as the POLY BD™ materials (available from Elf Atochem, Philadelphia, Pa.); the "PeP" series (available from Wyandotte Chemicals Corporation, Wyandotte, Mich.) of polyoxyalkylene tetrols having secondary hydroxyl groups, for example, "PeP" 450, 550, and 650; polycaprolactone polyols with M$_n$ in the range of about 200 to about 2000 such as TONE™ 0201, 0210, 0301, and 0310 (available from Union Carbide Corp., Danbury, Conn.); "PARAPLEX™ U-148" (available from Rohm and Haas Co., Philadelphia, Pa.), an aliphatic polyester diol; polyester polyols such as the MULTRON™ poly(ethyleneadipate)polyols (available from Mobay Chemical Corp., Irvine, Calif.); polycarbonate diols such as DURACARB™ 120, a hexanediol carbonate with M$_n$=900 (available from PPG Industries, Inc., Pittsburgh, Pa.); and the like; and mixtures thereof.

Preferred polyols include 2,2-bis(hydroxymethyl)propionic acid; N,N-bis(2-hydroxyethyl)-3-aminopropyltriethoxysilane; bicine; 3,5-dihydroxybenzoic acid; 2,4-dihydroxybenzoic acid; N-bis(2-hydroxyethyl)perfluorobutylsulfonamide; 1,2-ethanediol; 1,2- and 1,3-propanediol; 1,3- and 1,4-butanediol; neopentylglycol; 1,5-pentanediol; 3-methyl-1,5-pentanediol; 1,2-, 1,5-, and 1,6-hexanediol; bis(hydroxymethyl)cyclohexane; 1,8-octanediol; 1,10-decanediol; di(ethylene glycol); tri(ethylene glycol); tetra(ethylene glycol); di(propylene glycol); di(isopropylene glycol); tri(propylene glycol); poly(ethylene glycol) diols (number average molecular weight of about 200 to about 1500); poly(di(ethylene glycol) phthalate) diol (having number average molecular weights of, for example, about 350 or about 575); poly(propylene glycols) diols (number average molecular weight of about 200 to about 500); block copolymers of poly(ethylene glycol) and poly(propylene glycol) such as PLURONIC™ L31 (available from BASF Corporation, Mount Olive, N.J.); polydimethylsiloxane diol; fluorinated oxetane polyols made by the ring-opening polymerization of fluorinated oxetane such as POLY-3-FOX™ (available from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al); perfluoropolyether diols such as FOMBLIN™ ZDOL (HOCH$_2$CF$_2$O(CF$_2$O)$_{8-12}$(CF$_2$CF$_2$)$_{8-12}$CF$_2$CH$_2$OH, available from Ausimont, Inc., Thorofare, N.J.); 1,4-bis(1-hydroxy-1,1-dihydroperfluoroethoxyethoxy)perfluoro-n-butane (HOCH$_2$CF$_2$OC$_2$F$_4$O(CF$_2$)$_4$OC$_2$F$_4$OCF$_2$CH$_2$OH); 1,4-bis(1-hydroxy-1,1-dihydroperfluoropropoxy)perfluoro-n-butane (HOCH$_2$CF$_2$CF$_2$O(CF$_2$)$_4$OCF$_2$CF$_2$CH$_2$OH); polycaprolactone diols (number average molecular weight of about 200 to about 600); resorcinol; hydroquinone; 1,6-, 2,5-, 2,6-, and 2,7-dihydroxynaphthalene; 4,4'-biphenol; bisphenol A; bis(4-hydroxyphenyl)methane; and the like; and mixtures thereof.

More preferred polyols include bis(hydroxymethyl)propionic acid; bicine; N-bis(2-hydroxyethyl)perfluorobutylsulfonamide; 1,2-ethanediol; 1,2- and 1,3-propanediol; 1,4-butanediol; neopentylglycol; 1,2- and 1,6-hexanediol; di(ethylene glycol); tri(ethylene glycol); 1,4-bis(1-hydroxy-1,1-dihydroperfluoropropoxy)perfluoro-n-butane (HOCH$_2$CF$_2$CF$_2$O(CF$_2$)$_4$OCF$_2$CF$_2$CH$_2$OH); fluorinated oxetane polyols made by the ring-opening polymerization of fluorinated oxetane such as POLY-3-FOX™ (available from Omnova Solutions, Inc., Akron Ohio); poly(di(ethylene glycol) phthalate) diol (having number average molecular weights of, for example, about 350 or about 575); poly(ethylene glycol) diols (having number average molecular weights of, for example, about 200, 300, 400); polydimethylsiloxane diol; polypropylene glycol (having a number average molecular weight of, for example, about 425); dimer diol; polycaprolactone diol (having a number average molecular weight of, for example, about 530); 3,5-dihydroxybenzene; bisphenol A; resorcinol; hydroquinone; and mixtures thereof.

Fluorochemical monoalcohols suitable for use in preparing the chemical compositions of the present invention include those that comprise at least one $R_f^{10}$ group. The $R_f^{10}$ groups can contain straight-chain, branched-chain, or cyclic fluorinated alkylene groups or any combination thereof. The $R_f^{10}$ groups can optionally contain one or more heteroatoms (i.e. oxygen, sulfur, and/or nitrogen) in the carbon-carbon chain so as to form a carbon-heteroatom-carbon chain (i.e. a heteroalkylene group). Fully-fluorinated groups are generally preferred, but hydrogen or chlorine atoms can also be present as substituents, provided that no more than one atom of either is present for every two carbon atoms. It is additionally preferred that any $R_f^{10}$ group contain at least about 40% fluorine by weight, more preferably at least about 50% fluorine by weight. The terminal portion of the group is generally fully-fluorinated, preferably containing at least three fluorine atoms, e.g., CF$_3$O—, CF$_3$CF$_2$—, CF$_3$CF$_2$CF$_2$—, (CF$_3$)$_2$N—, (CF$_3$)$_2$CF—, SF$_5$CF$_2$—. Perfluorinated aliphatic groups (i.e., those of the formula C$_n$F$_{2n+1}$—) wherein n is 2 to 6 inclusive are the preferred R$_f$ groups, with n=3 to 5 being more preferred and with n=4 being the most preferred.

Useful fluorine-containing monoalcohols include compounds of the following formula II:

$$R_f^{10}\text{-Z-R}^{12}\text{—OH} \qquad \text{formula (II)}$$

wherein:
  $R_f^{10}$ is a perfluoroalkyl group or a perfluoroheteroalkyl group as defined above;
  Z is a connecting group selected from a covalent bond, a sulfonamido group, a carboxamido group, a carboxyl group, or a sulfinyl group; and
  $R^{12}$ is a divalent straight- or branched-chain alkylene, cycloalkylene, or heteroalkylene group of 1 to 14 carbon atoms, preferably 1 to 8 carbon atoms, more preferably 1 to 4 carbon atoms, and most preferably two carbon atoms.

Representative examples of useful fluorine-containing monoalcohols include the following:
  CF$_3$(CF$_2$)$_3$SO$_2$N(CH$_3$)CH$_2$CH$_2$OH,
  CF$_3$(CF$_2$)$_3$SO$_2$N(CH$_3$)CH(CH$_3$)CH$_2$OH,
  CF$_3$(CF$_2$)$_3$SO$_2$N(CH$_3$)CH$_2$CH(CH$_3$)OH,
  CF$_3$(CF$_2$)$_3$SO$_2$N(CH$_2$CH$_3$)CH$_2$CH$_2$OH,
  CF$_3$(CF$_2$)$_3$SO$_2$N(CH$_3$)CH$_2$CH$_2$SCH$_2$CH$_2$OH,
  C$_6$F$_{13}$SO$_2$N(CH$_3$)(CH$_2$)$_4$OH,
  CF$_3$(CF$_2$)$_7$SO$_2$N(H)(CH$_2$)$_3$OH,
  C$_8$F$_{17}$SO$_2$N(CH$_3$)CH$_2$CH$_2$OH,
  CF$_3$(CF$_2$)$_7$SO$_2$N(CH$_3$)(CH$_2$)$_4$OH,
  C$_8$F$_{17}$SO$_2$N(CH$_3$)(CH$_2$)$_{11}$OH,
  CF$_3$(CF$_2$)$_7$SO$_2$N(CH$_2$CH$_3$)CH$_2$CH$_2$OH,
  CF$_3$(CF$_2$)$_7$SO$_2$N(C$_2$H$_5$)(CH$_2$)$_6$OH,
  CF$_3$(CF$_2$)$_7$SO$_2$N(C$_2$H$_5$)(CH$_2$)$_{11}$OH,
  CF$_3$(CF$_2$)$_6$SO$_2$N(C$_3$H$_7$)CH$_2$OCH$_2$CH$_2$CH$_2$OH,
  CF$_3$(CF$_2$)$_7$SO$_2$N(CH$_2$CH$_2$CH$_3$)CH$_2$CH$_2$OH, CF$_3$(CF$_2$)$_9$SO$_2$N(CH$_2$CH$_2$CH$_3$)CH$_2$CH$_2$OH,
CF$_3$(CF$_2$)$_7$SO$_2$N(C$_4$H$_9$)CH$_2$CH$_2$OH,
CF$_3$(CF$_2$)$_7$SO$_2$N(C$_4$H$_9$)(CH$_2$)$_4$OH,
2-(N-methyl-2-(4-perfluoro-(2,6-diethylmorpholinyl))
 perfluoroethylsulfonamido)ethanol,
C$_3$F$_7$CONHCH$_2$CH$_2$OH,
C$_7$F$_{15}$CON(CH$_3$)CH$_2$CH$_2$OH,
C$_7$F$_{15}$CON(C$_2$H$_5$)CH$_2$CH$_2$OH,
C$_8$F$_{17}$CON(C$_2$H$_5$)CH$_2$CH$_2$OH,
C$_8$F$_{17}$CON(CH$_3$)(CH$_2$)$_{11}$OH,
C$_4$F$_9$CF(CF$_3$)CON(H)CH$_2$CH$_2$OH
C$_6$F$_{13}$CF(CF$_3$)CON(H)CH$_2$CH$_2$OH
C$_7$F$_{15}$CF(CF$_3$)CON(H)CH$_2$CH$_2$OH
C$_2$F$_5$O(C$_2$F$_4$O)$_3$CF$_2$CONHC$_2$H$_4$OH,
CF$_3$O(CF(CF$_3$)CF$_2$O)$_{1-36}$CF(CF$_3$)CH$_2$OH,
C$_2$F$_5$O(CF(CF$_3$)CF$_2$O)$_{1-36}$CF(CF$_3$)CH$_2$OH,
C$_3$F$_7$O(CF(CF$_3$)CF$_2$O)$_{1-36}$CF(CF$_3$)CH$_2$OH,
C$_4$F$_9$O(CF(CF$_3$)CF$_2$O)$_{1-36}$CF(CF$_3$)CH$_2$OH,
C$_3$F$_7$O(CF(CF$_3$)CF$_2$O)$_{12}$CF(CF$_3$)CH$_2$OH,
CF$_3$O(CF$_2$CF$_2$O)$_{1-36}$CF$_2$CH$_2$OH,
C$_2$F$_5$O(CF$_2$CF$_2$O)$_{1-36}$CF$_2$CH$_2$OH,
C$_3$F$_7$O(CF$_2$CF$_2$O)$_{1-36}$CF$_2$CH$_2$OH,
C$_4$F$_9$O(CF$_2$CF$_2$O)$_{1-36}$CF$_2$CH$_2$OH,
n-C$_4$F$_9$OC$_2$F$_4$OCF$_2$CH$_2$OCH$_2$CH$_2$OH
CF$_3$O(CF$_2$CF$_2$O)$_{11}$CF$_2$CH$_2$OH,
CF$_3$CF(CF$_2$Cl)(CF$_2$CF$_2$)$_6$CF$_2$CON(CH$_3$)CH$_2$CH$_2$OH,
CF$_3$(CF$_2$)$_6$SO$_2$CH$_2$CH$_2$OH,
CF$_3$(CF$_2$)$_7$SO$_2$CH$_2$CH$_2$OH,
C$_5$F$_{11}$COOCH$_2$CH$_2$OH,
CF$_3$(CF$_2$)$_6$COOCH$_2$CH$_2$OH,
C$_6$F$_{13}$CF(CF$_3$)COOCH$_2$CH$_2$CH(CH$_3$)OH
C$_8$F$_{17}$COOCH$_2$CH$_2$OH,
C$_8$F$_{17}$(CH$_2$)$_{11}$N(C$_2$H$_5$)CH$_2$CH$_2$OH,
C$_3$F$_7$CH$_2$OH,
CF$_3$(CF$_2$)$_6$CH$_2$OH,
Perfluoro(cyclohexyl)methanol
C$_4$F$_9$CH$_2$CH$_2$OH,
CF$_3$(CF$_2$)$_5$CH$_2$CH$_2$OH
CF$_3$(CF$_2$)$_6$CH$_2$CH$_2$CH$_2$OH,
CF$_3$(CF$_2$)$_7$CH$_2$CH$_2$OH,
CF$_3$(CF$_2$)$_7$CH$_2$CH$_2$SO$_2$N(CH$_3$)CH$_2$CH$_2$OH,
CF$_3$(CF$_2$)$_5$CH$_2$CH$_2$SO$_2$N(CH$_3$)CH$_2$CH$_2$OH,
CF$_3$(CF$_2$)$_3$CH$_2$CH$_2$SO$_2$N(CH$_3$)CH$_2$CH$_2$OH,
CF$_3$(CF$_2$)$_7$CH$_2$CH$_2$CH$_2$OH,
CF$_3$C F (CF$_2$H) (CF$_2$)$_{10}$(CH$_2$)$_2$OH,
CF$_3$C F (CF$_2$Cl) (CF$_2$)$_{10}$(CH$_2$)$_2$OH,
R$_f$(CH$_2$)$_2$S(CH$_2$)$_2$OH,
C$_4$F$_9$(CH$_2$)$_2$S(CH$_2$)$_2$OH,
R$_f$(CH$_2$)$_4$S(CH$_2$)$_2$H,
R$_f$(CH$_2$)$_2$S(CH$_2$)$_3$OH,
R$_f$(CH$_2$)$_2$SCH(CH$_3$)CH$_2$OH,
R$_f$(CH$_2$)$_4$SCH(CH$_3$)CH$_2$OH,
R$_f$CH$_2$CH(CH$_3$)S(CH$_2$)$_2$OH,
R$_f$(CH$_2$)$_2$S(CH$_2$)$_{11}$OH,
R$_f$(CH$_2$)$_2$S(CH$_2$)$_3$O(CH$_2$)$_2$OH,
R$_f$(CH$_2$)$_3$O(CH$_2$)$_2$OH,
R$_f$(CH$_2$)$_3$SCH(CH$_3$)CH$_2$OH, and the like, and mixtures thereof, wherein R$_f$ is a perfluoro-alkyl group of 2 to 16 carbon atoms. If desired, rather than using such alcohols, similar thiols can be utilized. Preferred fluorine-containing monoalcohols include 2-(N-methylper-fluoro butanesulfonamido)ethanol; 2-(N-ethylperfluorobu-tanesulfonamido)ethanol; 2-(N-methylperfluorobutane-sulfonamido)propanol; N-methyl-N-(4-hydroxybutyl) perfluorohexanesulfonamide; 1,1,2,2-tetrahydroperfluorooctanol; 1,1-dihydroperfluorooctanol;
C$_6$F$_{13}$CF(CF$_3$)CO$_2$C$_2$H$_4$CH(CH$_3$)OH; n-C$_6$F$_{13}$CF(CF$_3$)CON(H)CH$_2$CH$_2$OH; C$_4$F$_9$OC$_2$F$_4$OCF$_2$CH$_2$OCH$_2$CH$_2$OH; C$_3$F$_7$CON(H)CH$_2$CH$_2$OH; 1,1,2,2,3,3-hexahydroperfluoro-decanol; C$_3$F$_7$O(CF(CF$_3$)CF$_2$O)$_{1-36}$CF(CF$_3$)CH$_2$OH; CF$_3$O(CF$_2$CF$_2$O)$_{1-36}$CF$_2$CH$_2$OH; and the like; and mixtures thereof.

Long-chain hydrocarbon monoalcohols suitable for use in the chemical compositions of the present invention comprise at least one, essentially unbranched, hydrocarbon chain hav-ing from 10 to about 18 carbon atoms which may be saturated, unsaturated, or aromatic. These long-chain hydrocarbon monoalcohols can be optionally substituted, for example, with groups such as one or more chlorine, bromine, trifluo-romethyl, or phenyl groups. Representative long-chain hydrocarbon monoalcohols include 1-octanol, 1-decanol, 1-dodecanol, 1-tetradecanol, 1-hexadecanol,1-octadecanol, and the like, and mixtures thereof. Preferred long-chain hydrocarbon monoalcohols have 12 to 16 carbon atoms, with 12 to 14 carbon atoms being more preferred and 12 carbon atoms being most preferred for water solubility and perfor-mance.

Silane compounds suitable for use in the chemical compo-sitions of the present invention are those of the following formula (I):

$$X-R^{11}-Si-(Y)_3 \qquad \text{formula (I)}$$

wherein X, R$^{11}$, and Y are as defined previously. Therefore, these silane compounds contain one, two, or three hydrolyzable groups (Y) on the silicon and one organic group including an isocyanate-reactive or an active hydrogen reactive radical (X—R$^{11}$). Any of the conven-tional hydrolyzable groups, such as those selected from the group consisting of alkoxy, acyloxy, heteroalkoxy, heteroacyloxy, halo, oxime, and the like, can be used as the hydrolyzable group (Y). The hydrolyzable group (Y) is preferably alkoxy or acyloxy and more preferably alkoxy.

When Y is halo, the hydrogen halide liberated from the halogen-containing silane can cause polymer degradation when cellulose substrates are used. When Y is an oxime group, lower oxime groups of the formula —N=CR$^5$R$^6$, wherein R$^5$ and R$^6$ are monovalent lower alkyl groups com-prising about 1 to about 12 carbon atoms, which can be the same or different, preferably selected from the group consist-ing of methyl, ethyl, propyl, and butyl, are preferred.

Representative divalent bridging radicals (R$^{11}$) include, but are not limited to, those selected from the group consisting of —CH$_2$CH$_2$—, —CH$_2$CH$_2$CH$_2$—, —CH$_2$CH$_2$CH$_2$OCH$_2$CH$_2$—, —CH$_2$CH$_2$C$_6$H$_4$CH$_2$CH$_2$—, and —CH$_2$CH$_2$O(C$_2$H$_4$O)$_2$CH$_2$CH$_2$N(CH$_3$)CH$_2$CH$_2$CH$_2$—.

Other preferred silane compounds are those which contain one or two hydrolyzable groups, such as those having the structures R$^{12}$OSi(R$^{17}$)$_2$R$^{11}$XH and (R$^{18}$O)$_2$Si(R$^{17}$)R$^{11}$XH, wherein R$^{11}$ is as previously defined, and R$^{17}$ and R$^{18}$ are selected from the group consisting of a phenyl group, an alicyclic group, or a straight or branched aliphatic group having from about 1 to about 12 carbon atoms. Preferably, R$^{17}$ and R$^{18}$ are a lower alkyl group comprising 1 to 4 carbon atoms.

Following the hydrolysis of some of these terminal silyl groups, inter-reaction with a substrate surface comprising —SiOH groups or other metal hydroxide groups to form siloxane or metal-oxane linkages, e.g.,

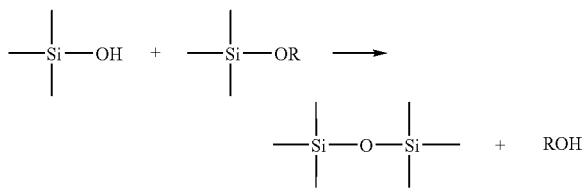

can occur. Bonds thus formed, particularly Si—O—Si bonds, are water resistant and can provide enhanced durability of the stain-release properties imparted by the chemical compositions of the present invention.

Such silane compounds are well known in the art and many are commercially available or are readily prepared. Representative isocyanate-reactive silane compounds include, but are not limited to, those selected from the group consisting of:

$H_2NCH_2CH_2CH_2Si(OC_2H_5)_3$;
$H_2NCH_2CH_2CH_2Si(OCH_3)_3$;
$H_2NCH_2CH_2CH_2Si(O\text{—}N\text{=}C(CH_3)(C_2H_5))_3$
$HSCH_2CH_2CH_2Si(OCH_3)_3$;
$HO(C_2H_4O)_3C_2H_4N(CH_3)(CH_2)_3Si(OC_4H_9)_3$;
$H_2NCH_2C_6H_4CH_2CH_2Si(OCH_3)_3$;
$HSCH_2CH_2CH_2Si(OCOCH_3)_3$;
$HN(CH_3)CH_2CH_2Si(OCH_3)_3$;
$HSCH_2CH_2CH_2SiCH_3(OCH_3)_2$;
$(H_3CO)_3SiCH_2CH_2CH_2NHCH_2CH_2CH_2Si(OCH_3)_3$;
$HN(CH_3)C_3H_6Si(OCH_3)_3$;
$CH_3CH_2OOCCH_2CH(COOCH_2CH_3)HNC_3H_6Si(OCH_2CH_3)_3$;
$C_6H_5NHC_3H_6Si(OCH_3)_3$;
$H_2NC_3H_6SiCH_3(OCH_2CH_3)_2$;
$HOCH(CH_3)CH_2OCONHC_3H_6Si(OCH_3)_3$;
$(HOCH_2CH_2)_2NCH_2CH_2CH_2Si(OCH_2CH_3)_3$
and mixtures thereof.

Representative examples of hydroxyl-reactive silane compounds include, but are not limited to, 3-isocyanatopropyltriethoxysilane, 3-isocyanatopropyltrimethoxysilane, and the like.

The chemical compositions of the present invention optionally may contain water-solubilizing compounds (W—H) comprising one or more water-solubilizing groups and at least one isocyanate-reactive hydrogen containing group. These water-solubilizing compounds include, for example, diols and monoalcohols comprising one or more water-solubilizing groups, added in addition to the one or more polyols and one or more monoalcohols as described above.

The solubilizing groups of the water-solubilizing compounds include, for example, carboxylate, sulfate, sulfonate, phosphate, phosphonate, ammonium, and quaternary ammonium groups. Such groups may be represented as —$CO_2M$, —$OSO_3M$, —$SO_3M$, —$OPO_3M$, —$PO(OM)_2$, —$NR_2HX$, —$NR^3X$, —$NRH_2X$, and —$NH_3X$, respectively, wherein M is H or one equivalent of a monovalent or divalent soluble cation such as sodium, potassium, calcium, and $NR_3H^+$; X is a soluble anion such as those selected from the group consisting of halide, hydroxide, carboxylate, sulfonates, and the like; and R is selected from the group consisting of a phenyl group, a cycloaliphatic group, or a straight or branched aliphatic group having from about 1 to about 12 carbon atoms. Preferably, R is a lower alkyl group having from 1 to 4 carbon atoms. The group —$NR_3X$ is a salt of a water-soluble acid, for example trimethyl ammonium chloride, pyridinium sulfate, etc. or an ammonium substituent. The group —$NR_2HX$ is the salt of a water-soluble acid, such as dimethyl ammonium acetate or propionate. The group —$NRH_2X$ is the salt of a water-soluble acid, such as methyl ammonium acetate or propionate. The group —$NH_3X$ is the salt of a water-soluble acid, such as ammonium acetate or propionate. The salt form can be made by simple neutralization of the acid group with a base such as an amine, a quaternary ammonium hydroxide, an alkali metal carbonate or hydroxide, or the like; or alternatively by simple reaction of the amino group with a carboxylic acid, a sulfonic acid, a halo acid, or the like. Carboxylic acid groups in salt form are preferred because they have been found to impart water solubility to the chemical compositions of the present invention without causing undue loss of the durable stain-release properties imparted by the chemical composition.

The isocyanate-reactive hydrogen containing group is selected from the group consisting of —OH, —SH, $NH_2$, and NRH wherein R is selected from the group consisting of a phenyl group, a cycloaliphatic group, or a straight or branched aliphatic group having from about 1 to about 12 carbon atoms. Preferably, R is a lower alkyl group having from 1 to 4 carbon atoms. A representative suitable diol with a solubilizing group is 1,1-bis(hydroxymethyl)propionic acid and its salts such as its ammonium salt. A representative suitable monoalcohol with a solubilizing group is glycolic acid ($HOCH_2COOH$) and its salts. The amount of water-solubilizing group should be sufficient to solubilize the chemical composition. Typically, the isocyanate:solubilizing group ratio should be from about 3:1 to about 16:1, preferably from about 5:1 to about 11:1. Illustrative water-solubilizing compounds having suitable water-solubilizing groups include, but are not limited to, those independently selected from the group consisting of $HOCH_2COOH$; $HSCH_2COOH$; $(HOCH_2CH_2)_2NCH_2COOH$; $HOC(CO_2H)(CH_2CO_2H)_2$; $(H_2N(CH_2)_nCH_2)_2NCH_3$ wherein n is an integer of 1 to 3; $(HOCH_2)_2C(CH_3)COOH$; $(HO(CH_2)_nCH_2)_2NCH_3$ wherein n is an integer of 1 to 3; $HOCH_2CH(OH)CO_2Na$; N-(2-hydroxyethyl)iminodiacetic acid ($HOCH_2CH_2N(CH_2COOH)_2$); L-glutamic acid ($H_2NCH(COOH)(CH_2CH_2COOH)$); aspartic acid ($H_2NCH(COOH)(CH_2COOH)$); glycine ($H_2NCH_2COOH$); 1,3-diamino-2-propanol-N,N,N',-tetraacetic acid ($HOCH(CH_2N(CH_2COOH)_2)_2$); iminodiacetic acid ($HN(CH_2COOH)_2$); mercaptosuccinic acid ($HSCH(COOH)(CH_2COOH)$); $H_2N(CH_2)_4CH(COOH)N(CH_2COOH)_2$; $HOCH(COOH)CH(COOH)CH_2COOH$; $(HOCH_2)_2CHCH_2COO)^-(NH(CH_3)_3)^+$; $CH_3(CH_2)_2CH(OH)CH(OH)(CH_2)_3CO_2K$; $H_2NCH_2CH_2OSO_3Na$; $H_2NC_2H_4NHC_2H_4SO_3H$; $H_2NC_3H_6NH(CH_3)C_3H_6SO_3H$; $(HOC_2H_4)_2NC_3H_6OSO_3Na$; $(HOCH_2CH_2)_2NC_6H_4OCH_2CH_2OSO_2OH$; N-methyl-4-(2,3-dihydroxypropoxy)pyridinium chloride, $((H_2N)_2C_6H_3SO_3)^-(NH(C_2H_5)_3)^+$; dihydroxybenzoic acid; 3,4-dihydroxybenzylic acid; 3-(3,5-dihydroxyphenyl)propionic acid; salts of the above amines, carboxylic acids, and sulfonic acids; and mixtures thereof.

The stain release compositions of the present invention can be made according to the following step-wise synthesis. As one skilled in the art would understand, the order of the steps is non-limiting and can be modified so as to produce a desired chemical composition. In the synthesis, the polyfunctional isocyanate compound and the polyol are dissolved together under dry conditions, preferably in a solvent, and then heating the resulting solution at approximately 40 to 80° C., preferably approximately 60 to 70° C., with mixing in the presence of a catalyst for one-half to two hours, preferably one hour. Depending on reaction conditions (e.g., reaction temperature and/or polyfunctional isocyanate used), a catalyst level of up to about 0.5 percent by weight of the polyfunctional isocyanate/polyol mixture may be used, but typically about 0.00005 to about 0.5 percent by weight is required, 0.02 to 0.1 percent by weight being preferred. Suitable catalysts include, but are not limited to, tertiary amine and tin compounds.

Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Sigma-Aldrich Chemical Co., Milwaukee, Wis.), and 1,8-diazabicyclo[5.4.0.]undec-7-ene (DBU, Sigma-Aldrich Chemical Co., Milwaukee, Wis). Tin compounds are preferred.

A mixture of polyols can be used instead of a single polyol. For example, in a preferred embodiment a polyol mixture comprising a polyol with a water-solubilizing group and a polyol with an $R_f$ group is used. When the polyfunctional isocyanate compound is a triisocyanate, the polyol is preferably a diol to prevent undesired gelation, which can occur when polyols having three or more hydroxyl groups are reacted with a triisocyanate.

The resulting isocyanate functional urethane oligomers and compounds are then further reacted with one or more of the monoalcohols described above. The monoalcohol(s) is (are) added to the above reaction mixture, and react(s) with a substantial portion of the remaining NCO groups. The above temperatures, dry conditions, and mixing are continued one-half to two hours, preferably one hour. Terminal fluorine-containing and/or long-chain hydrocarbon groups are thereby bonded to the isocyanate functional urethane oligomers and compounds. These oligomers and compounds are further functionalized with silane groups described above by reacting any of the remaining NCO groups in the resulting mixture with one or more of the reactive hydrogen-containing silane compounds described above. Thus, the silane compound(s) is (are) added to the reaction mixture, using the same conditions as with the previous additions. Aminosilanes are preferred, because of the rapid and complete reaction that occurs between the remaining NCO groups and the silane compound's amino groups. Isocyanato functional silane compounds may be used and are preferred when the ratio of polyfunctional isocyanate compound to the polyol and monoalcohol is such that the resulting oligomer has a terminal hydroxyl group.

Water-solubilizing compounds can be added and reacted with NCO groups under the conditions described above in any of the steps described above. For example, as mentioned above, the water-solubilizing compound can be added as a mixture with the polyol. Alternatively, the water-solubilizing compound can be added (a) after reaction of the polyol with the polyfunctional isocyanate, (b) as a mixture with the monoalcohol(s), (c) after reaction of the polyol and monoalcohol with the polyfunctional isocyanate, (d) as a mixture with the silane, and (e) after the reaction of the polyol, monoalcohol, and silane with the polyfunctional isocyanate. When the water-solubilizing compound is a monoalcohol, it is preferably added as a mixture with the fluorine-containing monoalcohol or the long-chain hydrocarbon monoalcohol. When the water-solubilizing compound is a diol, it is preferably added as a mixture with the polyol.

When the chemical composition of the present invention contains a urethane oligomer having one or more carboxylic acid groups, solubility of the composition in water can be further increased by forming a salt of the carboxylic acid group(s). Basic salt-forming compounds, such as tertiary amines, quaternary ammonium hydroxides, and inorganic bases, including, but not limited to, those selected from the group consisting of sodium hydroxide, potassium hydroxide, cesium hydroxide, lithium hydroxide, calcium hydroxide, magnesium hydroxide, zinc hydroxide, and barium hydroxide, may be used in a sufficient amount (i.e., in an amount to maintain a pH of greater than about 6). These basic salt-forming compounds preferably can be added in the water phase, but optionally in the preparation of the urethane oligomers, to form salts with the incorporated, pendant and/or terminal carboxylic acid groups on the urethane oligomer. Examples of useful amine salt-forming compounds include, but are not limited to, those selected from the group consisting of ammonia, trimethylamine, triethylamine, tripropylamine, triisopropylamine, tributylamine, triethanolamine, diethanolamine, methyldiethanolamine, morpholine, N-methylmorpholine, dimethylethanolamine, and mixtures thereof. Preferred salt forming compounds include those selected from the group consisting of ammonia, trimethylamine, dimethylethanolamine, methyldiethanolamine, triethylamine, tripropylamine, and triisopropylamine, since the chemical compositions prepared therefrom are not excessively hydrophilic upon coating and curing. Since certain salts formed by the reaction of salt forming compounds, such as potassium hydroxide in combination with a carboxylic acid group, could result in undesired reaction with NCO groups, it is preferred to add the salt forming compound in a water phase after all of the diols, alcohol, and silane compounds have been reacted with the NCO groups of the polyfunctional isocyanate compound.

The molar ratios of the components of the chemical composition of the present invention are as follows:

one or more polyfunctional isocyanate compounds and one or more polyols are used in a molar ratio of from about 1:0.25 to about 1:0.45;

one or more polyfunctional isocyanate compounds and one or more monoalcohols (as discussed above) are used in a molar ratio of from about 1:0.30 to about 1:0.60;

one or more polyfunctional isocyanate compounds and one or more silanes (of formula I above) are used in a molar ratio of from about 1:0.001 to about 1:0.15; and one or more polyfunctional isocyanate compounds and one or more water-solubilizing compounds (as discussed above) are used in a molar ratio of from about 1:0 to about 1:1.6.

The preferred molar ratios are as follows:

one or more polyfunctional isocyanate compounds and one or more polyols are used in a molar ratio of from about 1:0.35 to about 1:0.42;

one or more polyfunctional isocyanate compounds and one or more monoalcohols (as discussed above) are used in a molar ratio of from about 1:0.45 to about 1:0.55;

one or more polyfunctional isocyanate compounds and one or more silanes (of formula I above) are used in a molar ratio of from about 1:0.03 to about 1:0.08; and one or more polyfunctional isocyanate compounds and one or more water-solubilizing compounds (as discussed above) are used in a molar ratio of from about 1:0 to about 1:1.0.

EXAMPLES

Formulation and Treatment Procedure for Textile Substrates:

Treatment baths were formulated containing a defined amount of the fluorochemical polymer. Treatments were applied to the test substrates by padding to provide a concentration as indicated in the examples (based on fabric weight and indicated as SOF (solids on fabric)). Samples were air dried at ambient temperature for 24-48 hours followed by conditioning at 21° C. and 50% relative humidity for 2 hours (air cure). Alternatively, the samples were dried and cured at 160° C. during 1.5 minutes or at 150° C. during 10 minutes, as indicated in the examples.

After drying and heat cure, the substrates were tested for their repellency properties.

Formulation and Treatment Procedure for Carpet:

Treatment baths were formulated containing a defined amount of the fluorochemical compound. Treatments were applied to carpet by spray application to provide 30% wet pick up (WPU). Treated samples were dried at 120° C. during 15-20 min. After drying, the treated carpet substrates were tested for their repellency properties.

Substrates used for the evaluation of treatments of this invention were commercially available and are listed below:
- IND: "Imported Nexday Twill" 100% ring spun cotton, dyed unfinished from Avondale mills in Graniteville S.C., USA;
- SHIPP: "Super Hipagator" 100% ring/OE spun cotton, dyed unfinished from Avondale Mills in Graniteville S.C., USA;
- K-2: A 65% polyester, 35% cotton woven twill fabric (8.5 ounces/yd$^2$ (271 grams/square meter) basis wt; available from Avondale Mills, Graniteville, S.C.)
- TCIK: Tan 100% Cotton Interlock Knit (9.5 ounces/yd$^2$), dyed unfinished; available from Majestic Laces Ltd., Toronto, CA.
- TCTK: tan 100% Cotton Thermal Underwear Knit (approximately 9.0 ounces/yd$^2$), dyed unfinished; available from Majestic Laces Ltd., Toronto, CA.
- PES/Co (2681.4): polyester/cotton 65/35 fabric, style no. 2681.4, available from Utexbel N.V., Ronse, Belgium;
- PAµ (7819.4): 100% polyamide microfiber, style no. 7819.4, available from Sofinal, Belgium;
- Co (1511.1): 100% cotton: bleached, mercerized cotton poplin, style no. 1511.1, available from Utexbel N.V., Ronse, Belgium;
- PESµ (6145.3): 100% polyester microfiber, style no. 6145.3, available from Sofinal, Belgium;
- Reeve: 50/50 polyester cotton; available from Reeve, Bishopville, N.C.;
- NS1: white polyamide carpet (level loop), 500 g/m$^2$, available from Associated Weavers, Belgium; and
- NS2: white polyamide carpet (cut pile), 700 g/m$^2$, available from Associated Weavers, Belgium.

Respective data of water and oil repellency shown in the Examples and Comparative Examples were based on the following methods of measurement and evaluation criteria:

Spray Rating (SR)

The spray rating of a treated substrate is a value indicative of the dynamic repellency of the treated substrate to water that impinges on the treated substrate. The repellency was measured by Standard Test Number 22, published in the 1985 Technical Manual and Yearbook of the American Association of Textile Chemists and Colorists (AATCC), and was expressed in terms of 'spray rating' of the tested substrate. The spray rating was obtained by spraying 250 ml water on the substrate from a height of 15 cm. The wetting pattern was visually rated using a 0 to 100 scale, where 0 means complete wetting and 100 means no wetting at all.

Water Repellency Test (WR)

The water repellency (WR) of a substrate was measured using a series of water-isopropyl alcohol test liquids and was expressed in terms of the "WR" rating of the treated substrate. The WR rating corresponded to the most penetrating test liquid that did not penetrate or wet the substrate surface after 10 seconds exposure. Substrates which were penetrated by 100% water (0% isopropyl alcohol), the least penetrating test liquid, were given a rating of 0; substrates resistant to 100% water were given a rating W and substrates resistant to 100% isopropyl alcohol (0% water), the most penetrating test liquid, were given a rating of 10. Other intermediate ratings were calculated by dividing the percent isopropylalcohol in the test liquid by 10, e.g., a treated substrate resistant to a 70%/30% isopropyl alcohol/water blend, but not to an 80%/20% blend, would be given a rating of 7.

Oil Repellency (OR)

The oil repellency of a substrate was measured by the American Association of Textile Chemists and Colorists (AATCC) Standard Test Method No. 118-1983, which test was based on the resistance of a treated substrate to penetration by oils of varying surface tensions. Treated substrates resistant only to NUJOL® mineral oil (the least penetrating of the test oils) were given a rating of 1, whereas treated substrates resistant to heptane (the most penetrating of the test liquids) were given a rating of 8. Other intermediate values were determined by use of other pure oils or mixtures of oils, as shown in the following table.

| Standard Test Liquids | |
|---|---|
| AATCC Oil Repellency Rating Number | Compositions |
| 1 | NUJOL ® |
| 2 | NUJOL ® /n-Hexadecane 65/35 |
| 3 | n-Hexadecane |
| 4 | n-Tetradecane |
| 5 | n-Dodecane |
| 6 | n-Decane |
| 7 | n-Octane |
| 8 | n-Heptane |

Bundesmann Test

The impregnating effect of rain on treated substrates was determined using the Bundesmann Test Method (DIN 53888).

In this test, the treated substrates were subjected to a simulated rainfall, while the back of the substrate was being rubbed. The appearance of the upper exposed surface was checked visually after 1, 5 and 10 minutes and was given a rating between 1 (complete surface wetting) and 5 (no water remained on the surface). Besides the observation of the wetting pattern, also the water absorption (% abs) was measured. Well treated samples gave low absorption results.

Laundering Procedure 1 (HL Ironing)

The procedure set forth below was used to prepare treated substrate samples designated in the examples below as "5 Home Launderings—Ironing (5HL—Ironing)". A sheet of treated substrate (generally square 400 cm$^2$ to about 900 cm$^2$) was placed in a washing machine (Miele W 724) along with a ballast sample (at least 1.4 kg of 90×90 cm$^2$ hemmed pieces of approximately 250 g/m unfinished sheeting substrate, either cotton or 50/50 polyester/cotton, available from Test Fabrics, Inc., New Jersey, USA). The total weight of the treated substrates and ballast should be 1.8+/−0.2 kg. 60 g IEC Test Detergent with perborate, Type I (available through common detergent suppliers) was added and the washer was filled with 30 l water. The water was heated to 40° C.+/−3° C. The substrate and ballast load were washed 5 times, followed by five rinse cycles and centrifuging. The samples were not dried between repeat cycles. After the washes, the treated substrate and dummy load were dried together in a dryer at 65° C., for 45+−5 minutes. After drying, the treated substrate was pressed for 15 seconds, using an iron set at a temperature of 150-160° C.

Laundering Procedure 2 (HL)

The procedure set forth below was used to prepare treated substrate samples designated in the examples below as "5 Home Launderings (5HL)".

A 230 g sample of generally square, 400 cm$^2$ to about 900 cm$^2$ sheets of treated substrate was placed in a washing machine along with a ballast sample (1.9 kg of 8 oz fabric in the form of generally square, hemmed 8100 cm$^2$ sheets). A commercial detergent ("Tide Ultra Liquid" deep cleaning formula, available from Proctor and Gamble, 90 g) was added and the washer was filled to high water level with hot water (41° C.+−2° C.). The substrate and ballast load were washed five times using a 12-minute normal wash cycle.

The substrate and ballast were dried together in a conventional tumble drier at 65+−5° C. during 45+−5 minutes. Before testing, the substrates were conditioned at room temperature during about 4 hours.

10 HL (10 Home Launderings) or 20 HL (20 Home Launderings) indicated that the substrate was washed 10 or 20 times respectively according to the procedure above.

Accelerated Dry Soil Test (ADS)

The accelerated dry soil test measures the tendency of a substrate to resist dry soil during use. A total of four treated samples, sized 14 cm×17 cm were soiled in an Accelerated Soil Tester (available from Custom Scientific Instrument, New Jersey), filled with 60 steel balls (1.27 cm diameter), using 3M Standard Carpet Dry Soil (available from 3M, Order No. SPS-2001) during a ten minute run. After removal of the samples from the soil tester, the excess soil was removed by blowing with compressed air. Evaluations were made by comparing to a 3M Soil Resistance Rating Board (available from 3M, Order No. SPS-1006) in an "Evaluation Area" (as indicated in AATCC Test Method 124-1984) with an "Overhead Lighting Arrangement" (as indicated in AATCC Test Method 124-1984, section 4.3 and FIG. 1). A dry soil rating of 5 indicated that there was no increase in soiling versus a blank, a dry soil rating of 1 refers to severe soiling.

Stain Release Test

This test evaluates the release of forced-in oil-based stains from the treated fabric surface during simulated home laundering. Five drops of mineral oil, Stain K (Kaydol, Witco Chemical Co.) are dropped onto the fabric surface in a single puddle, and a separate puddle of 5 drops of MAZOLA™ corn oil, Stain E, are dropped on the fabric, and in a third puddle, 5 drops of dirty motor oil, Strain C, (3M Co.) are dropped onto the fabric. The puddles are covered with glassine paper, and weighted with a five-pound weight each for 60 seconds. The weights and glassine paper are removed from the fabric. The fabric sample is hung for 15-60 minutes, and then washed and dried. Samples are evaluated against a rating board, and assigned a number from 1 to 8. An 8 represents total removal of the stain, where 1 is a very dark stain. A more detailed description of the test is written in the 3M Protective Material Division's "Stain Release Test I" method (Document # 98-0212-0725-7).

Application of Compositions to Polyester/Cotton Woven Fabrics (Treating Fabrics)

A 65% polyester, 35% cotton woven twill fabric (8.5 ounces/yd$^2$ (271 grams/square meter) basis wt; available from Avondale Mills, Graniteville, S.C.) was dipped into a bath of the diluted chemical composition and immediately sent through a nip. The concentration of the bath was adjusted to produce a fabric that when dry had a fluorochemical solids coating ranging from 0.2 to 1.0% solids on the fabric total weight. The bath also contained a glyoxal-type resin, PERMAFRESH™ ULF (Omnova Solutions, Inc., Chester, S.C.), at about 12% on the weight of the bath, a citric acid activated magnesium chloride catalyst, CATALYST™ 531 (Omnova Solutions, Inc.), at about 3.0% on the weight of the bath, and a nonionic surfactant, PAT-WET™ LF-55 (Yorkshire Pat-Chem Inc., Greenville, S.C.), at about 0.1% on the weight of the bath. The fabric was dried and cured for 10 minutes at 150° C. Various performance tests were run on the fabric.

Application of Compositions to Cotton/Polyester Knit Fabric (Treating Fabrics)

Knit fabrics (100% cotton knit) were treated in the same way as the woven fabrics, with the exception that FRE-EREZ™ 845 (Noveon, Inc., Cleveland, Ohio), a pre-catalyzed glyoxal-type resin, was used in place of the resin and catalyst combination above (Test Method IV), at about 12% on the weight of the bath.

| Descriptor | Formula/Structure | Availability |
|---|---|---|
| AC-600 | FLUOWET ™ AC-600; $C_6F_{13}C_2H_4O_2CCH=CH_2$ | Clariant, Charlotte, NC |
| AIBN | Azobisisobutyronitrile | Sigma-Aldrich, Milwaukee, WI |
| APTES | 3-Aminopropyltriethoxysilane; $H_2NCH_2CH_2CH_2Si(OCH_2CH_3)_3$ | Sigma-Aldrich |
| ARQUAD ™ 12-50 | dodecyl trimethyl ammonium chloride | Akzo, Netherlands |
| DBTDL | Dibutyl tin dilaurate | Sigma-Aldrich |
| DDI 1410 | dimer diisocyanate | Henkel, Düsseldorf, Germany |
| Des N-100 | DESMODUR ™ N 100; Polyfunctional isocyanate resin based on hexamethylene diisocyanate; eq wt = 191; —NCO$_{avg}$/molecule > 3.0 | Bayer, Pittsburgh, PA |

-continued

| Descriptor | Formula/Structure | Availability |
|---|---|---|
| Des N-3300 | DESMODUR ™ N 3300; Polyfunctional isocyanate resin based on hexamethylene diisocyanate; eq wt = 194; —$NCO_{avg}$/molecule > 3.0 | Bayer |
| Des W | DESMODUR ™ W; methylene bis(4-cyclohexyl isocyanate) | Bayer |
| EA-600 | FLUOWET ™ EA-600; $C_6F_{13}C_2H_4OH$ | Clariant, Charlotte,NC |
| Sermul ™ EA 266 | $C_{13}$— alcohol polyethylene glycol ether (15EO) sulphate, Na salt | Sasol, Germany |
| ETHOQUAD ™ 18/25 | methyl polyoxyethylene(15)octadecyl ammonium chloride | Akzo |
| FBSEE | $C_4F_9SO_2N(CH_2CH_2OH)_2$ | |
| FLUOWET ™ EA 812 | $C_nF_{2n+1}CH_2CH_2OH(n_{avg}\sim 9)$ | Clariant |
| GMS | Glycerol monostearate | Acme-Hardesty, Santa Barbara, CA |
| HFE-7100 | Perfluorobutyl methyl ether | 3M, StPaul, MN |
| Isofol 18T | 2-alkylalkanol | Condea, Germany |
| IPDI | Isophorone diisocyanate | Merck KGaA, Darmstadt, Germany |
| MPEG-750 | methoxypolyethylene glycol (MW 750) | Union Carbide, Danbury, CT |
| MEKO | $CH_3C(=NOH)C_2H_5$ | Sigma-Aldrich |
| MIBK | Methyl isobutyl ketone; 4-methyl-2-pentanone | Sigma-Aldrich |
| MONDUR ™ MR | Aromatic polymeric isocyanate based on diphenylmethane-diisocyanate | Bayer |
| ODI | Octadecyl isocyanate; $CH_3(CH_2)_{17}NCO$ | Sigma-Aldrich |
| PAPI | VORANATE ™ M220: polymethylene polyphenyl isocyanate | Dow Chemical, Midland, MI |
| Poly(styrene-co-allyl alcohol) | $[CH_2CH(C_6H_5)]_x[CH_2CH(CH_2OH)]_y$ $M_n = 1200, MW_{avg} = 2200$ | Sigma-Aldrich |
| Rewopon ™ IM/OA | imidazoline type surfactant | Rewo |
| TOLONATE ® HDT | Tris(6-isocyanatohexyl)isocyanurate | Rhodia |
| UNILIN ™ 350 | Polyethylene alcohol; $MW_{avg} = 350$ | Baker, Petrolite; Tulsa, OK |

$(HFPO)_k$-alc: HFPO oligomer alcohols, $CF_3CF_2CF_2$—O—$(CF(CF_3)CF_2O)_n CF(CF_3)CONHCH_2CH_2OH$, consisting of a mixture of oligomers with different chain lengths. The indexes k and n are indicative of the mathematical average of the number of repeating HFPO-units and k=n+2. The percentage of oligomeric alcohols with a fluorinated polyether group having a molecular weight lower than 750 g/mol was 3.2% for $(HFPO)_{11.5}$-alc, 0% for $(HFPO)_{10.7}$-alc and $(HFPO)_{9.7}$-alc; 5.7% for $(HFPO)_{8.8}$-alc and 15.9% for $(HFPO)_{5.5}$-alc.

$(HFPO)_k$-diol: HFPO oligomer diol, $CF_3CF_2CF_2$—O—$(CF(CF_3)CF_2O)_n CF(CF_3)CONHCH_2CH(OH)CH_2OH$, consisting of a mixture of oligomers with different chain lengths. The indexes k and n are indicative of the mathematical average of the number of repeating HFPO-units and k=n+2. The percentage of oligomeric alcohols with a fluorinated polyether group having a molecular weight lower than 750 g/mol was 5.7% for $(HFPO)_{8.8}$-diol.

MeFBSE: $C_4F_9SO_2N(CH_3)CH_2CH_2OH$, can be prepared according to WO 01/30873, Ex 2 Part A.

FBSEE: $C_4F_9SO_2N(CH_2CH_2OH)_2$

MeFBSEA: $C_4F_9SO_2N(CH_3)CH_2CH_2OC(O)CH=CH_2$, can be prepared according to WO 01/30873, Ex 2 Part A & B.

(4-1)MeFBSEA-ol: oligomer alcohol MeFBSEA/2-mercaptoethanol 4/1, prepared according to U.S. Pat. No. 6,239,247 B1, column 12, lines 50-59.

(4-1)MeFBSEA-diol: oligomer diol MeFBSEA/3-mercapto 1,2-propane diol 4/1, prepared according to U.S. Pat. No. 6,239,247 B1, column 12, lines 50-59

(4-1)ODA-ol: oligomer alcohol octadecylacrylate/2-mercaptoethanol 4/1, prepared according to U.S. Pat. No. 6,239,247 B1, column 12, lines 50-59 Aldrich Chemical Co.

(4-1)AC 600-ol: oligomer alcohol, prepared from FLUOWET™ AC 600/2-mercaptoethanol 4/1, according to U.S. Pat. No. 6,239,247 B1, column 12, lines 50-59, except that AIBN was used and the reaction was run at 75° C. during 15 hours.

A. Synthesis of HFPO-oligomer Alcohol and Diol

1. Synthesis of HFPO-oligomer Alcohol ($(HFPO)_k$-alc

Several HFPO-oligomer alcohols ($(HFPO)_k$-alc) were prepared according to the general procedure as given for the synthesis of $CF_3CF_2CF_2$—O—$(CF(CF_3)CF_2O)_{6.8}CF(CF_3)CONHCH_2CH_2OH$, indicated in table 1 as $(HFPO)_{8.8}$-alc.

A 1 liter 3-necked reaction flask was equipped with a stirrer, a condenser, a dropping funnel, a heating mantle and a thermometer. The flask was charged with 1000 g $CF_3CF_2CF_2$—O—$(CF(CF_3)CF_2O)_{6.8}CF(CF_3)COOCH_3$. The mixture was heated to 40° C. and 43.4 g ethanolamine was added via the dropping funnel, over a period of 30 minutes. The reaction mixture was kept at 65° C. during 3 hours. FTIR analysis indicated complete conversion. The end product could be purified as follows: 500 ml ethylacetate were added and the organic solution was washed with 200 ml HCL (1N), followed by 2 washings with 200 ml brine. The organic phase was dried over $MgSO_4$. Ethylacetate was evaporated with waterjet vacuum, using a Büchi rotary evaporator. The product was dried at 50° C. during 5 hours, using oil pump vacuum (<1 mbar). An alternative purification step included evaporation of methanol, formed during reaction, via water jet vacuum, using a Büchi rotary evaporator (up to 75° C.=<100 mm Hg). Residual methanol was further removed with oil pump vacuum (up to 80° C., =<10 mbar).

The HFPO-oligomer alcohol (HFPO)$_{8.8}$-alc obtained, was a yellow coloured oil, with medium viscosity. The structure was confirmed by means of NMR.

HFPO-oligomer alcohols with other chain lengths were prepared essentially according to the same procedure.

2. Synthesis of HFPO-oligomer diol ((HFPO)$_x$-diol))

$CF_3CF_2CF_2$—O—$(CF(CF_3)CF_2O)_{6.8}CF(CF_3)$ CONHCH$_2$CH(OH)CH$_2$OH, indicated as (HFPO)$_{8.8}$-diol was prepared starting from $CF_3CF_2CF_2$—O—$(CF(CF_3)CF_2O)_{6.8}CF(CF_3)COOCH_3$, using the following procedure:

A round bottom flask, equipped with a stirrer, a nitrogen inlet and a temperature control was charged with 147.6 g $CF_3CF_2CF_2$—O—$(CF(CF_3)CF_{2O})_{6.8}CF(CF_3)COOCH_3$ and 9.57 g 3-amino-1,2-propanediol. The reaction mixture was stirred while heating to 50° C. An exothermic reaction was noticed (up to 70° C.). The reaction was continued during 24 hours. FTIR analysis indicated complete conversion of the methylester function. The reaction product was dissolved in a mixture of MIBK/acetone/HFE 7100 (100 g/100 g/75 g) and washed 2 times with a solution of 5% HCl and two times with water. Phase separation occurred at 65° C. The solvent phase was dried over sodiumsulfate and the solvents were removed by evaporation. The structure of the (HFPO)$_{8.8}$-diol was confirmed by FTIR.

B. Synthesis of FC Polyether Urethanes

1. Synthesis of FC Polyether Urethanes Starting from HFPO-oligomer Alcohol a. Fluorochemical Polyether Urethane Derivatives FC-UR1 to FC-UR3 and FC-UR9 to FC-UR12.

Fluorochemical polyether urethane derivatives FC-UR1 to FC-UR3 and FC-UR9 to FC-UR12, as given in table 1, were made according to the synthesis of FC-UR1: (HFPO)$_{8.8}$-alc/PAPI/MEKO (1/1/2)

In a first step, 20 g (HFPO)$_{8.8}$-alc was charged into a 3-necked reaction flask, equipped with a magnetic stirring bar, a condenser, a thermometer, a heating mantle and a nitrogen inlet. 38.5 g ethylacetate and 3 g HFE-7100 were added to obtain a clear solution. 5.4 g PAPI were added, followed by a slow addition of 2.3 g MEKO (through a syringe). The reaction was run at 75° C. during 6 hours. An additional 0.46 g MEKO was added and the reaction was continued at 75° C. during 6 hours. FTIR analysis indicated complete conversion.

FC-UR2 to FC-UR3 and FC-UR9 to FC-UR12 were made essentially according to the same procedure, except that no HFE-7100 was used and 2 drops DBTDL catalyst were added.

In a second step, the fluorochemical polyether urethane derivatives were emulsified. The reaction mixture was dispersed in water containing ETHOQUAD 18/25 (5% on solids) using a Branson 450 sonifier (2' u-sound at 65° C.). The solvent was stripped off with waterjet vacuum, using a Büchi rotary evaporator. Stable milky dispersions were obtained.

b. Fluorochemical Polyether Urethane FC-UR4 and Comparative Urethanes C-UR1 to C-UR4.

For the synthesis of FC-UR4 and C-UR1 to C-UR4, 250 ml polymerisation flasks were charged with the reactants in amounts to provide a molar ratio as given in table 1. Ethyl acetate was added to obtain 40% solids solutions. The reaction flasks were sealed after purging with nitrogen and the reactions were run in a preheated Launder-o-meter, set at 80° C., overnight. FT-IR analysis indicated complete conversion. The fluorochemical polyether urethanes were emulsified as described above, using a mixture of ETHOQUAD™ 18/25 (2.5% on solids) and ARQUAD™ 12-50 (2.5% on solids) or using Sermul™ EA266 (7% on solids).

c. Fluorochemical Polyether Urethane Derivatives FC-UR5 to FC-UR8

Three-necked round bottom flasks were charged with the reactants in molar ratios as given in Table 1. Ethyl acetate was added to obtain ~50% solids solutions and one drop of DBTDL was added. The flasks were sealed, purged with nitrogen, and heated at 75° C. overnight. (Note: For the preparation of FC-UR5 and FC-UR6 MEKO was added at this point in the molar ratios given in Table 1 and the mixture was reheated to 75° C. and allowed to stir for 4 additional hours.) A 3% aqueous solution of ETHOQUAD™ 18/25 (~10% on solids) was slowly added to the mixture keeping the temperature >60° C. during addition. The mixture was sonified with a ColeParmer model CPX-600 ultrasonic processor for 5 minutes. Ethyl acetate was removed by distillation under reduced pressure on a Büchi rotary evaporator.

d. Fluorochemical Polyether Urethane Derivatives FC-UR41 and FC-UR42

A reaction flask was charged with 100 g $\alpha\alpha\alpha$-trifluorotoluene, Des N-3300 and (HFPO)$_{5.5}$-alc in amounts to provide the molar ratio as given in Table 1. 1 drop of DBTDL was added and the mixture was heated at 95° C. during 1 hour. (4-1) ODA-ol (FC-UR41) or polystyrene-coallyl alcohol (FC-UR42) were added and the mixture was heated at 75° C. during 12 hours. FT-IR analysis indicated complete conversion.

In a second step, the fluorochemical polyether urethanes were emulsified. The reaction mixtures were dispersed in water containing ETHOQUAD™ 18/25 (5% on solids) using a Branson 450 sonifier (4 min u-sound at 65° C.). The solvent was stripped with a water jet aspirator using a Büchi rotary evaporator. Stable milky dispersions were obtained.

e. Fluorochemical Polyether Urethane FC-UR43

In a first step, a 3-necked reaction flask, equipped with a magnetic stirring bar, a condenser, a thermometer, a heating mantle and a nitrogen inlet was charged with 59.6 g (HFPO)$_{10.7}$-alc, 4.9 g 1-C$_{18}$H$_{37}$OH, 27.6 g Tolonate® HDT and 133 g 4-methyl-2-pentanone under nitrogen. The reaction mixture was heated to 85° C. and 0.1 g DBTDL was added. The reaction was run under nitrogen atmosphere, at 85° C. during 3 hours. 7.9 g MEKO were added and the reaction was stirred overnight at 85° C., under nitrogen. A solution of 16.7 g 30% aqueous ETHOQUAD™ 18/25 in 388.4 g DIW was slowly added to the reaction mixture, keeping the temperature >=80° C. The mixture was sonified using a Cole-Parmer Model CPX 600 sonifier at a power setting of 600 W and 100% amplitude for 5 minutes. The solvent was stripped off with waterjet vacuum using a Buchi rotary evaporator. A stable 20% solids dispersion was obtained.

f. Fluorochemical Polyether Urethane FC-UR44

A reaction flask was charged with 50 g $\alpha\alpha\alpha$-trifluorotoluene, Tolonate® HDT, (HFPO)8.8-alc and EA-600 in amounts to provide the molar ratio as shown in Table 1. 1 drop of DBTDL was added and the mixture was heated at 75° C. for 2 hours. To this was added MEKO and the mixture was heated at 75° C. for 1 hour. FT-IR analysis indicated complete conversion.

In a second step, this fluorochemical polyether urethane was emulsified. The reaction mixture was dispersed in water containing ETHOQUAD™ 18/25 (5% on solids) using a Branson 450 sonifier (4 minutes u-sound at 65° C.). The solvent was stripped off with waterjet vacuum, using a Büchi rotary evaporator. A stable milky dispersion was obtained.

g. Fluorochemical Polyether Urethane FC-UR46

A three-necked round bottom flask was charged with (HFPO)$_{9.7}$-alc (13.9 g), MONDUR™ MR (22.2 g) and MIBK (75.0 g) and heated to 75° C. under a nitrogen atmosphere. DBTDL (0.10 g) was added and the reaction mixture was held at temperature for 3 hours. MEKO (13.9 g) was slowly added to the reation mixture, and allowed to stir overnight at 75° C. A solution of ETHOQUAD™ 18/25 (30% aq; 8.3 g) was slowly added to the mixture, keeping the temperature >70° C. during addition. The mixture was sonified with a Cole Parmer model CPX-600 ultrasonic processor for 5 minutes. MIBK was removed by distillation under reduced pressure on a Büchi rotary evaporator.

h. Synthesis of Fluorochemical Polyether Urethane FC-UR47

To a 250 ml 3-neck flask equipped with a mechanical stirrer, condenser, thermometer, heating mantle and nitrogen inlet was charged: 8.0 g (41.88 meq.) TOLONATE™ HDT, 6.25 g (2.094 meq.) MPEG 750 (25% solution in ethyl acetate; pre-dried over 4A molecular sieves), 0.5565 g Stearyl alcohol (2.094 meq) and 43.4 g ethyl acetate. The mixture was heated to 68° C. under a nitrogen purge and three drops DBTDL were added. Heating was continued for 2 hours. A solution of 18.00 g (10.47 meq) $(HFPO)_{9.1}$-alc in 22.07 g ethyl acetate was prepared and added to the reaction mixture. The mixture was held at temperature for one hour and twenty minutes. A solution of 2.37 g (27.2 meq) MEKO in 2 g ethyl acetate was added, and the mixture was allowed to stir overnight at 68° C. The urethane mixture was dispersed into water with 1.52 g Ethoquad™ 18/25 (5% on solids) using a Cole Parmer Ultrasonic Homogenizer (for 5 minutes while still hot). Ethyl acetate was removed using a rotary evaporator. A milky dispersion was obtained.

2. Synthesis of FC Polyether Urethanes Starting from HFPO-oligomer Diol a. Synthesis of FC Polyether Urethane $(HFPO)_{8.8}$-diol/GMS/PAPI/MEKO 1/1/3/5 (FC-UR13)

In a first step 15.5 g $(HFPO)_{8.8}$-diol was charged into a 3-necked reaction flask, equipped with a stirrer, a condenser, a thermometer, a heating mantle and a nitrogen inlet. 11.02 g PAPI, 3.6 g GMS and 4.4 g MEKO were added, followed by 52 g MIBK and 3 drops of DBTDL catalyst. The reaction was run at 75° C. during 7 hours. FTIR analysis indicated complete conversion.

In a second step, the (HFPO)-urethane was emulsified. Therefore, a mixture of 60 g water and 3.75 g Rewopon™ IM/OA.HAc (20% solution/5% on solids) was made. The aqueous solution was heated at 65° C. and the organic phase as prepared under step 1, was added under stirring. The 2 phase system was emulsified using a Branson Sonifier 450W for 3 min at full capacity. The solvent was removed by evaporation and a light brown milky emulsion was obtained.

b. Synthesis of FC Polyether Urethanes FC-UR14 to FC-UR18

In a first step, 100 ml reaction flasks were charged with $(HFPO)_{8.8}$-alc, $(HFPO)_{8.8}$-diol and isocyanates, in amounts to provide molar ratios as given in table 2. Ethyl acetate was added to provide a final concentration of 40% solids. The bottles were purged with nitrogen and sealed. The reaction was run at 75° C. in a preheated Launder-o-meter, during 4 hours. GMS and MEKO were added and the reaction was run at 75° C. during 16 hours. FT-IR analysis indicated complete conversion.

In a second step, the FC polyether urethanes were emulsified. Therefore, a mixture of ETHOQUAD 18/25 (5% on solids) in DI water was heated to 75° C. The FC polyether urethane solutions, prepared above, were heated to 75° C. and added to the water phase while stirring. The 2 phase system was emulsified using a Branson Sonifier 450W for 2 min at full capacity. The solvent was removed by evaporation and stable milky dispersions were obtained.

3. Synthesis of FC Polyether Urethanes Comprising HFPO-oligomers and Fluorochemical Alkyl Derivatives a. Synthesis of FC Polyether Urethanes FC-UR19 to FC-UR40

Fluorochemical polyether urethanes FC-UR19 to FC-UR40 were made as follows:

In a first step, 100 ml reaction flasks were charged with $(HFPO)_{8.8}$-alc, $(HFPO)_{8.8}$-diol, MeFBSE, FBSEE, MeFBSEA oligomer alcohol and/or diol, isocyanates and blocking agents, in amounts to provide molar ratios as given in table 1. Ethylacetate was added to provide a concentration of 40% solids. Two drops DBTDL catalyst were added. The bottles were purged with nitrogen and sealed. The reactions were run overnight at 75° C. in a preheated Launder meter. FT-IR analysis indicated complete conversion.

In a second step, the fluorochemical polyether urethanes were emulsified. Therefore, a 20% mixture of Rewopon™ IM/OA.Hac (Hac=acetic acid) (7% on solids) was made in water. The aqueous solution was heated at 55° C. The organic phase as prepared under step 1, was added under stirring. The two-phase system was emulsified using a Branson Sonifier 450W for 3 min at full capacity. The solvent was removed by evaporation and a stable dispersion was obtained.

b. Synthesis of FC Polyether Urethane FC-UR45

A reaction flask was charged with 100 g ααα-trifluorotoluene, Tolonate® HDT, $(HFPO)_{8.8}$-alc and (4-1)AC 600-ol, in amounts to provide the molar ratio as shown Table 1. 1 drop of DBTDL was added and the mixture was heated at 75° C. for 12 hours. To this was added MEKO and the mixture was heated at 75° C. during 1 hour. FT-IR analysis indicated complete conversion.

In a second step, this fluorochemical polyether urethane was emulsified. The reaction mixture was dispersed in water containing ETHOQUAD™ 18/25 (5% on solids) using a Branson 450 sonifier (4 minutes u-sound at 65° C.). The solvent was stripped off with waterjet vacuum, using a Buchi rotary evaporator. A stable milky dispersion was obtained.

c. Synthesis of FC Polyether Urethane FC-UR48

A 500 mL three-necked round bottom flask was charged with 34.8 grams $(HFPO)_{9.7}$-alc, 0.9 grams MeFBSE, 2.0 grams MPEG-750 and 50.0 grams MIBK. 10.1 grams Tolonate™ HDT was then added, and the mixture was heated to 75° C. under nitrogen with stirring. Then 0.03 grams DBTDL was added to the cloudy mixture. An exothermic reaction began, and the temperature rose to ~90° C. When the exotherm subsided the reaction was heated at 75° C. for three hours. 2.3 grams MEKO was added dropwise the container being rinsed in with 2 ml MIBK. The reaction was stirred at 75° C. overnight under nitrogen. The next day a solution of 8.3 grams 30% aqueous Ethoquad™ 18/25 in 219.2 grams DI water was added, keeping the temperature >70° C. during addition. The ensuing mixture was sonified for five minutes. MIBK was removed by heating under reduced pressure with a Buchi rotary evaporator. This yielded a white dispersion.

TABLE 1 composition of FC polyether urethane derivatives

| Number | Composition | Molar Ratio (equivalents) |
| --- | --- | --- |
| FC-UR1 | $(HFPO)_{8.8}$-alc/PAPI/MEKO | 1/1/2 |
| FC-UR2 | $(HFPO)_{8.8}$-alc/PAPI/MEKO | 2/1/1 |
| FC-UR3 | $(HFPO)_{8.8}$-alc/PAPI | 3/1 |
| FC-UR4 | $(HFPO)_{8.8}$-alc/Des N/$C_{16}H_{33}OH$ | 1/1/2 |

TABLE 1-continued composition of FC polyether urethane derivatives

| Number | Composition | Molar Ratio (equivalents) |
|---|---|---|
| FC-UR5 | (HFPO)$_{5.5}$-alc/Des N 100/MEKO | (1/3/2) |
| FC-UR6 | (HFPO)$_{11.5}$-alc/Des N 100/MEKO | (1/3/2) |
| FC-UR7 | (HFPO)$_{5.5}$-alc/Des N 100 | 3/1 |
| FC-UR8 | (HFPO)$_{11.5}$-alc/Des N 100 | 3/1 |
| FC-UR9 | (HFPO)$_{8.8}$-alc/GMS/PAPI/MEKO | 1/1/2/3 |
| FC-UR10 | (HFPO)$_{8.8}$-alc/GMS/PAPI/MEKO | 1/2/3/4 |
| FC-UR11 | (HFPO)$_{8.8}$-alc/GMS/PAPI/MEKO | 1/3/4/5 |
| FC-UR12 | (HFPO)$_{8.8}$-alc/GMS/PAPI/MEKO | 2/2/3/3 |
| FC-UR13 | (HFPO)$_{8.8}$-diol/GMS/PAPI/MEKO | 1/1/3/5 |
| FC-UR14 | (HFPO)$_{8.8}$-alc/(HFPO)$_{8.8}$-diol/PAPI/MEKO | 1/1/2/3 |
| FC-UR15 | (HFPO)$_{8.8}$-alc/(HFPO)$_{8.8}$-diol/PAPI/GMS/MEKO | 1/1/3/1/4 |
| FC-UR16 | (HFPO)$_{8.8}$-alc/(HFPO)$_{8.8}$-diol/PAPI/GMS/MEKO | 2/2/4/1/4 |
| FC-UR17 | (HFPO)$_{8.8}$-alc/(HFPO)$_{8.8}$-diol/DDI/PAPI/GMS/MEKO | 2/2/1/3/1/3 |
| FC-UR18 | (HFPO)$_{8.8}$-alc/(HFPO)$_{8.8}$-diol/DDI/PAPI/GMS/MEKO | 2/2/2/3/1/5 |
| FC-UR19 | (HFPO)$_{8.8}$-diol/FBSEE/PAPI/MeFBSE | 1/1/3/5 |
| FC-UR20 | (HFPO)$_{8.8}$-diol/FBSEE/PAPI/MeFBSE/MEKO | 1/1/3/3/2 |
| FC-UR21 | (HFPO)$_{8.8}$-diol/FBSEE/PAPI/MEKO | 1/1/3/5 |
| FC-UR22 | (HFPO)$_{8.8}$-alc/FBSEE/PAPI/MeFBSE | 2/4/2/5 |
| FC-UR23 | (HFPO)$_{8.8}$-alc/FBSEE/PAPI/MeFBSE/MEKO | 2/4/2/3/2 |
| FC-UR24 | (HFPO)$_{8.8}$-alc/FBSEE/PAPI/MeFBSE | 2/2/2/3 |
| FC-UR25 | (HFPO)$_{8.8}$-alc/FBSEE/PAPI/MEKO | 2/2/3/3 |
| FC-UR26 | (HFPO)$_{8.8}$-alc/FBSEE/PAPI/MEKO | 1/1/2/3 |
| FC-UR27 | (HFPO)$_{8.8}$-alc/FBSEE/PAPI/MEKO | 1/2/3/4 |
| FC-UR28 | (HFPO)$_{8.8}$-alc/FBSEE/PAPI/MEKO | 2/4/5/5 |
| FC-UR29 | (HFPO)$_{8.8}$-alc/FBSEE/PAPI/MEKO | 1/4/5/6 |
| FC-UR30 | (HFPO)$_{8.8}$-alc/FBSEE/PAPI/MEKO | 2/6/7/7 |
| FC-UR31 | (HFPO)$_{8.8}$-alc/FBSEE/PAPI/MEKO | 3/6/7/6 |
| FC-UR32 | (HFPO)$_{8.8}$-diol/FBSEE/PAPI/MEKO | 1/3/5/7 |
| FC-UR33 | (HFPO)$_{8.8}$-diol/(4-1)MeFBSEA-ol/PAPI/MEKO | 2/2/3/3 |
| FC-UR34 | (HFPO)$_{8.8}$-alc/(4-1)MeFBSEA-diol/PAPI/MEKO | 2/2/3/3 |
| FC-UR35 | (HFPO)$_{8.8}$-alc/(4-1)MeFBSEA-diol/FBSEE/PAPI/MEKO | 1/0.5/1.2/3/4 |
| FC-UR36 | (HFPO)$_{8.8}$-alc/(4-1)MeFBSEA-diol/FBSEE/PAPI/MEKO | 1/0.25/0.75/3/4 |
| FC-UR37 | (HFPO)$_{8.8}$-alc/(4-1)MeFBSEA-diol/FBSEE/PAPI/MEKO | 2/0.25/1.75/3/3 |
| FC-UR38 | (HFPO)$_{8.8}$-alc/(4-1)MeFBSEA-diol/FBSEE/PAPI/MEKO | 2/1/3/5/5 |
| FC-UR39 | (HFPO)$_{8.8}$-alc/(4-1)MeFBSEA-ol/FBSEE/PAPI/MEKO | 1/0.5/2/3/3.5 |
| FC-UR40 | (HFPO)$_{8.8}$-alc/(4-1)MeFBSEA-ol/FBSEE/PAPI/MEKO | 1.5/0.5/2/3/3 |
| FC-UR41 | (HFPO)$_{5.5}$-alc/Des N-3300/(4-1)ODA-ol | 2.3/1/1 |
| FC-UR42 | (HFPO)$_{5.5}$-alc/Des N-3300/Polystyrene-coallyl alcohol | (2/1/1) |
| FC-UR43 | (HFPO)$_{10.7}$-alc/Tolonate ® HDT/C$_{18}$H$_{37}$OH/MEKO | (2.5/10/1.25/6.25) |
| FC-UR44 | (HFPO)$_{8.8}$-alc/Tolonate ® HDT/EA-600/MEKO | (1/4/1/2) |
| FC-UR45 | (HFPO)$_{8.8}$-alc/Tolonate ® HDT/(EA-600AC)$_4$OH/MEKO | (1/4/1/2) |
| FC-UR46 | (HFPO)$_{9.7}$-alc/Mondur™ MR/MEKO | (1/20/19) |
| FC-UR47 | (HFPO)$_{9.1}$-alc/Tolonate™ HDT/MPEG 750/Stearylalcohol/MEKO | (5/20/1/1/13) |
| FC-UR48 | (HFPO)$_{9.7}$-alc/Tolonate™ HDT/MeFBSE/MPEG 750/MEKO | (1/2.5/0.125/0.125/0.125) |
| C-UR1 | MeFOSE/PAPI/MEKO | 1/1/2 |
| C-UR2 | Flowet EA 812/PAPI/MEKO | 1/1/2 |
| C-UR3 | (HFPO)$_{8.8}$-alc/ODI | 1/1 |
| C-UR4 | (HFPO)$_{8.8}$-alc/DDI 1410 | 2/1 |

Examples 1 to 8

In examples 1 to 8, different substrates were treated with FC polyether urethanes as indicated in table 2, so as to give 0.3% SOF. After treatment the fabrics were dried at 160° C. during 1.5 minutes. The treated substrates were tested for their oil and water repellency initially and after 5 home launderings (ironing). The results are summarized in Table 2.

TABLE 2

Substrates treated with FC polyether urethanes with or without blocking group

| Ex No | FC-UR | Initial | | | 5 HL Ironing | | |
|---|---|---|---|---|---|---|---|
| | | OR | WR | SR | OR | WR | SR |
| | | PESµ (6145.3) | | | | | |
| 1 | FC-UR2 | 2 | 2 | 90 | 2 | 1 | 75 |
| 2 | FC-UR3 | 3 | 1 | 70 | 2 | 0 | 60 |
| | | PAµ (7819.4) | | | | | |
| 3 | FC-UR2 | 3 | 2 | 60 | 3 | 2 | 70 |
| 4 | FC-UR3 | 3 | 2 | 50 | 3 | 1 | 60 |
| | | PES/Co (2681.4) | | | | | |
| 5 | FC-UR2 | 3 | 1 | 75 | 2 | 2 | 60 |
| 6 | FC-UR3 | 3 | W | 0 | 3 | 0 | 0 |
| | | Co (1511.1) | | | | | |
| 7 | FC-UR2 | 3 | 1 | 70 | 2 | 0 | 60 |
| 8 | FC-UR3 | 4 | 0 | 0 | 1 | 0 | 0 |

The results indicated that substrates having high and especially durable oil repellency could be made when they were treated with FC polyether urethanes. The water repellency of the treated substrate could further be increased through the use of a masking group in the FC polyether urethane.

Examples 9 to 20

In examples 9 to 20, the influence of the add-on level of the fluorochemical polyether urethane was evaluated. Therefore, different substrates were treated with FC polyether urethane FC-UR1, at different add on levels. After treatment the fabrics were dried and cured at 160° C. for 1.5 minutes. The treated fabrics were tested for oil and water repellency, initially and after home launderings (ironing). The results are given in Table 3.

TABLE 3

Substrates treated with FC polyether urethane FC-UR1; influence of add-on level

| Ex No | % SOF FC-UR1 | Initial OR | WR | SR | Bundesmann 1' | 5' | 10' | 5 HL ironing OR | WR | SR |
|---|---|---|---|---|---|---|---|---|---|---|
| | | | | PESµ (6145.3) | | | | | | |
| 9 | 0.3 | 1 | 1 | 95 | 2 | 1 | 1 | 0 | 1 | 75 |
| 10 | 0.5 | 1 | 2 | 100 | 5 | 3 | 2 | 0 | 1 | 90 |
| 11 | 1 | 2 | 2 | 100 | 5 | 4 | 2 | 1 | 1 | 100 |
| | | | | PAµ (7819.4) | | | | | | |
| 12 | 0.3 | 3 | 2 | 70 | / | / | / | 0 | 1 | 50 |
| 13 | 0.5 | 4 | 3 | 75 | / | / | / | 1 | 1 | 50 |
| 14 | 1 | 4 | 3 | 80 | / | / | / | 2 | 2 | 70 |
| | | | | PES/Co (2681.4) | | | | | | |
| 15 | 0.3 | 4 | 2 | 80 | 1 | 1 | 1 | 1 | 1 | 70 |
| 16 | 0.5 | 4 | 2 | 95 | 2 | 1 | 1 | 2 | 1 | 75 |
| 17 | 1 | 4 | 3 | 100 | 4 | 2 | 1 | 3 | 2 | 90 |
| | | | | Co (1511.1) | | | | | | |
| 18 | 0.3 | 2 | 2 | 90 | 1 | 1 | 1 | 1 | 1 | 60 |
| 19 | 0.5 | 3 | 2 | 100 | 2 | 1 | 1 | 1 | 1 | 85 |
| 20 | 1 | 4 | 3 | 100 | 3 | 2 | 1 | 3 | 2 | 90 |

The results indicated that the performance could be tailored by variation of the add-on level. Substrates having high oil and/or water repellency with good durability could be made.

Examples 21 to 24 and Comparative Examples C-1 to C-8

In examples 21 to 24, substrates were treated with FC-UR1, and with comparative FC urethanes, made from long chain FC alkyl alcohols. The substrates were treated so as to give 0.3% SOF. After treatment, the substrates were dried and cured at 160° C., during 1.5 min. The results of oil and water repellency are given in table 4.

TABLE 4 substrates treated with FC polyether urethane

| Ex No | FC-UR | Initial OR | WR | SR | Bundesmann 1' | 5' | 10' | % abs | 5 HL Ironing OR | WR | SR |
|---|---|---|---|---|---|---|---|---|---|---|---|
| | | | | PESµ (6145.3) | | | | | | | |
| 21 | FC-UR1 | 2 | 2 | 100 | 4 | 2 | 1 | 12.1 | 0 | 1 | 85 |
| C-1 | C-UR1 | 1 | 2 | 100 | 4 | 2 | 1 | 12 | 0 | 2 | 90 |
| C-2 | C-UR2 | 2 | 3 | 100 | 5 | 4 | 4 | 4.4 | 0 | 2 | 90 |
| | | | | PAµ (7819.4) | | | | | | | |
| 22 | FC-UR1 | 3 | 1 | 50 | / | / | / | / | 2 | 2 | 60 |
| C-3 | C-UR1 | 3 | 7 | 90 | 1 | 1 | 1 | 25.9 | 0 | 2 | 70 |
| C-4 | C-UR2 | 4 | 7 | 100 | 2 | 1 | 1 | 24.8 | 1 | 2 | 75 |
| | | | | PES/Co (2681.4) | | | | | | | |
| 23 | FC-UR1 | 4 | 2 | 90 | 1 | 1 | 1 | 23.3 | 1 | 2 | 75 |
| C-5 | C-UR1 | 3 | 3 | 100 | 4 | 2 | 1 | 18.8 | 1 | 2 | 80 |
| C-6 | C-UR2 | 5 | 6 | 100 | 5 | 4 | 4 | 11.2 | 1 | 3 | 85 |
| | | | | Co (1511.1) | | | | | | | |
| 24 | FC-UR1 | 4 | 2 | 90 | 1 | 1 | 1 | 32.6 | 2 | 1 | 70 |
| C-7 | C-UR1 | 3 | 4 | 100 | 4 | 1 | 1 | 25.9 | 1 | 2 | 80 |
| C-8 | C-UR2 | 4 | 4 | 100 | 5 | 3 | 1 | 23.5 | 2 | 2 | 80 |

The results indicated that most substrates, treated with FC polyether urethanes according to the invention, had the same good initial and better durable oil repellency, compared to substrates treated with FC urethanes, made from long chain FC alcohols. A further advantage could be seen in that the substrates treated with FC polyether urethanes had a softer feel than the substrates treated with the comparative urethanes.

Examples 25 to 31 and Comparative Examples C-9 to C-16

In examples 25 to 31, the influence of the functionality of the isocyanate used in the synthesis of the fluorochemical polyether urethane was evaluated. Substrates were treated with aliphatic urethane FC-UR4, made with triisocyanate Des N-100. In comparative examples C-9 to C-16, substrates were treated with the comparative urethanes C-UR3 and C-UR4, made from FC polyether oligomer and diisocyanates. All substrates were treated so as to give 0.3% SOF. After treatment, the substrates were dried and cured at 160° C. during 1.5 min. Oil and water repellency were evaluated. The results are given in Table 5.

TABLE 5

| Ex No | FC-UR | Initial OR | WR | SR | 5 HL Ironing OR | WR | SR |
|---|---|---|---|---|---|---|---|
| | | PESµ (6145.3) | | | | | |
| 25 | FC-UR4 | 2 | 2 | 70 | 1 | 0 | 50 |
| C-9 | C-UR3 | 0 | 1 | 0 | 0 | 0 | 0 |
| C-10 | C-UR4 | 0 | 1 | 50 | 0 | 0 | 0 |
| | | PAµ (7819.4) | | | | | |
| 27 | FC-UR4 | 3 | 1 | 50 | 1 | 2 | 50 |
| C-11 | C-UR3 | 0 | 1 | 50 | 0 | 0 | 0 |
| C-12 | C-UR4 | 0 | 1 | 50 | 0 | 0 | 0 |

TABLE 5-continued

| Ex | | Initial | | | 5 HL Ironing | | |
|---|---|---|---|---|---|---|---|
| No | FC-UR | OR | WR | SR | OR | WR | SR |
| PES/Co (2681.4) | | | | | | | |
| 30 | FC-UR4 | 3 | 2 | 50 | 2 | 0 | 0 |
| C-13 | C-UR3 | 0 | 0 | 0 | 0 | 0 | 0 |
| C-14 | C-UR4 | 0 | 0 | 0 | 0 | 0 | 0 |
| Co (1511.1) | | | | | | | |
| 31 | HFPO-UR4 | 3 | 1 | 70 | 2 | 0 | 60 |
| C-15 | C-UR3 | 0 | 0 | 0 | 0 | 0 | 0 |
| C-16 | C-UR4 | 0 | 0 | 0 | 0 | 0 | 0 |

The results indicated that substrates treated with urethanes made from the HFPO oligomer alcohol and triisocyanate had good performance, both for oil and water repellency. On the other hand, substrates treated with urethanes made from HFPO oligomer alcohol and diisocyanate had very low performance. On PES/Co and Cotton, no oil or water repellency was observed.

Examples 32 to 41

In examples 32 to 41 the performance of treated substrates after air cure as well as the performance after extended home launderings was evaluated. Therefore, cotton samples were treated with FC polyether urethanes FC-UR5 and FC-UR6, so as to give and add-on level as indicated in table 6. The samples were evaluated for their oil and water repellency, after air cure and after curing at 150° C. during 10 minutes. No water repellency was observed after air cure. The other results are given in Table 6.

TABLE 6

| Ex | | % | Air dry | Initial | | 5 HL | | 20 HL | |
|---|---|---|---|---|---|---|---|---|---|
| No | FC-UR | SOF | OR | OR | SR | OR | SR | OR | SR |
| Cotton (IND) | | | | | | | | | |
| 32 | FC-UR5 | 0.2 | 4.5 | 5 | 80 | 4 | 60 | 2 | 60 |
| 33 | FC-UR5 | 0.5 | 5 | 6 | 80 | 5 | 75 | 4 | 60 |
| 34 | FC-UR5 | 1 | 6 | 6 | 80 | 5 | 70 | 4 | 60 |
| 35 | FC-UR6 | 0.5 | 3 | 4 | 60 | 2 | 0 | 1 | 0 |
| 36 | FC-UR6 | 1 | 4 | 5 | 60 | 4 | 0 | 3 | 0 |
| Cotton (SHIPP) | | | | | | | | | |
| 37 | FC-UR5 | 0.2 | 4 | 4.5 | 75 | 3 | 50 | 2 | 0 |
| 38 | FC-UR5 | 0.5 | 5 | 5 | 80 | 5 | 75 | 3.5 | 60 |
| 39 | FC-UR5 | 1 | 5 | 6 | 75 | 5 | 75 | 4 | 5 |
| 40 | FC-UR6 | 0.5 | 3 | 4 | 50 | 2 | 50 | 1 | 0 |
| 41 | FC-UR6 | 1 | 5 | 5 | 60 | 5 | 50 | 3 | 0 |

Note:
the OR of samples 34 and 39 was 3 after 50 HL.

As can be seen from the results in table 6, very strong and durable oil repellency could be achieved on cotton, especially with the lower chain oligomeric urethanes. Furthermore, a remarkably high oil repellency was noticed for the air dried samples. High durability of the oil repellency was observed, even after repeated home launderings.

Examples 42 to 53

In examples 42 to 53 cotton samples were treated with fluorochemical polyether urethanes FC-UR7 and FC-UR8, derived from short chain and long chain HFPO oligomers respectively, so as to give and add-on level as indicated in Table 7. The samples were air dried and cured at 150° C. during 10 minutes. The oil and water repellency were measured after air dry, after 150° C. cure and after 5 HL. No water repellency was observed after air dry or 5 HL. The other results are given in Table 7.

TABLE 7

Cotton substrates treated with FC polyether urethanes

| | | | | Air dry | Initial | | 5 HL |
|---|---|---|---|---|---|---|---|
| Ex | FC-UR | Substrate | % SOF | OR | OR | SR | OR |
| 42 | FC-UR7 | IND | 0.2 | 4 | 5 | 0 | / |
| 43 | FC-UR7 | IND | 0.5 | 5 | 6 | 50 | 5 |
| 44 | FC-UR7 | IND | 1 | 5 | 6 | 50 | 5 |
| 45 | FC-UR7 | SHIPP | 0.2 | 4 | 5 | 0 | / |
| 46 | FC-UR7 | SHIPP | 0.5 | 5 | 5 | 50 | 5 |
| 47 | FC-UR7 | SHIPP | 1 | 5 | 5 | 50 | 5 |
| 48 | FC-UR8 | IND | 0.2 | 2 | 2 | 0 | / |
| 49 | FC-UR8 | IND | 0.5 | 5 | 5 | 60 | 3 |
| 50 | FC-UR8 | IND | 1 | 5 | 5 | 0 | 5 |
| 51 | FC-UR8 | SHIPP | 0.2 | 2.5 | 2 | 0 | / |
| 52 | FC-UR8 | SHIPP | 0.5 | 4.5 | 5 | 0 | 4 |
| 53 | FC-UR8 | SHIPP | 1 | 5 | 5 | 0 | 5 |

The substrates, treated with the FC polyether urethane had very high and durable oil repellency.

Examples 54 to 69

In examples 54 to 69, different substrates were treated with FC polyether urethanes, made with difunctional chain extenders, so as to give 0.3% SOF. After treatment the fabrics were dried at 160° C. during 1.5 minutes. The treated substrates were tested for their oil and water repellency, initially and after 5 home launderings (ironing). The results are summarized in table 8.

TABLE 8

Substrates treated with FC polyether urethanes having difunctional chain extenders

| Ex No | FC-UR | Initial | | | Bundesmann | | | | 5 HL ironing | | |
|---|---|---|---|---|---|---|---|---|---|---|---|
| | | OR | WR | SR | 1' | 5' | 10' | % abs | OR | WR | SR |
| PESμ (6145.3) | | | | | | | | | | | |
| 54 | FC-UR9 | 0.5 | 2 | 100 | 2 | 2 | 1 | 23 | 0 | 1 | 90 |
| 55 | FC-UR10 | 1 | 2 | 100 | 2 | 2 | 1 | 23 | 0 | 1 | 85 |
| 56 | FC-UR11 | 1 | 2 | 100 | 3 | 1 | 1 | 22 | 0 | 1 | 90 |
| 57 | FC-UR12 | 2 | 2 | 100 | 2 | 1 | 1 | 29 | 1 | 1 | 90 |
| PAμ (7819.4) | | | | | | | | | | | |
| 58 | FC-UR9 | 3 | 2.5 | 85 | 1 | 1 | 1 | 43 | 2 | 2 | 75 |
| 59 | FC-UR10 | 3 | 3 | 90 | 1 | 1 | 1 | 34 | 2 | 2 | 75 |
| 60 | FC-UR11 | 2 | 2 | 70 | / | / | / | / | 2 | 1.5 | 60 |
| 61 | FC-UR12 | 3 | 2 | 70 | / | / | / | / | 2 | 4.5 | 60 |
| PES/Co (2681.4) | | | | | | | | | | | |
| 62 | FC-UR9 | 1.5 | 2 | 100 | 2 | 1 | 1 | 31 | 1 | 1 | 85 |
| 63 | FC-UR10 | 1 | 3 | 90 | 2 | 1 | 1 | 35 | 1 | 1.5 | 80 |
| 64 | FC-UR11 | 2 | 3 | 95 | 3 | 1 | 1 | 23 | 2 | 2 | 85 |
| 65 | FC-UR12 | 3 | 2 | 80 | 1 | 1 | 1 | 31 | 2 | 1 | 70 |
| Co (1511.1) | | | | | | | | | | | |
| 66 | FC-UR9 | 2 | 2 | 85 | / | / | / | / | 2 | 1 | 70 |
| 67 | FC-UR10 | 1 | 2 | 90 | / | / | / | / | 1 | 2 | 80 |
| 68 | FC-UR11 | 2 | 2 | 85 | / | / | / | / | 1 | 1 | 80 |
| 69 | FC-UR12 | 3 | 2 | 85 | / | / | / | / | 1 | 1 | 75 |

The results indicated that the incorporation of difunctional chain extenders in the polyurethane resulted in many cases in an improvement of the overall performance of substrates treated therewith. Substrates with strong initial and also durable dynamic repellency could be made.

Examples 70 to 81

In examples 70 to 81, different substrates were treated with FC polyether urethane made from HFPO-diol (FC-UR13) or with a 50/50 blend of FC polyether urethanes, as indicated in table 11, so as to give 0.3% SOF. After treatment the fabrics were dried at 160° C. during 1.5 minutes. The treated substrates were tested for their oil and water repellency, initially and after 5 home launderings (ironing). The results are summarized in Table 9.

TABLE 9

Substrates treated with FC polyether urethane blends

| Ex No | FC-UR | Initial | | | Bundesmann | | | | 5 HL ironing | | |
|---|---|---|---|---|---|---|---|---|---|---|---|
| | | OR | WR | SR | 1' | 5' | 10' | % abs | OR | WR | SR |
| PESμ (6145.3) | | | | | | | | | | | |
| 70 | FC-UR13 | 0 | 1 | 100 | 4.5 | 4 | 4 | 12.2 | 0 | 1 | 85 |
| 71 | FC-UR10/ FC-UR13 | 0.5 | 2 | 100 | 4.5 | 4.5 | 4.5 | 3.9 | 0 | 1 | 95 |
| 72 | FC-UR3/ FC-UR13 | 2 | 2 | 100 | 3.5 | 2.5 | 1 | 13.4 | 1 | 1 | 90 |
| PAμ (7819.4) | | | | | | | | | | | |
| 73 | FC-UR13 | 2 | 2.5 | 100 | 5 | 4 | 3 | 11.7 | 0.5 | 1.5 | 90 |
| 74 | FC-UR10/ FC-UR13 | 2 | 2 | 95 | 3 | 2 | 1.5 | 23.1 | 1.5 | 2 | 75 |
| 75 | FC-UR3/ FC-UR13 | 3 | 2 | 75 | / | / | / | / | 2 | 2 | 60 |
| PES/Co (2681.4) | | | | | | | | | | | |
| 76 | FC-UR13 | 1 | 1 | 100 | 1 | 1 | 1 | 25.9 | 0 | 1 | 80 |
| 77 | FC-UR10/ FC-UR13 | 2.5 | 2.5 | 100 | 3 | 2 | 1 | 12.4 | 1 | 1 | 80 |
| 78 | FC-UR3/ FC-UR13 | 2.5 | 2 | 95 | 1 | 1 | 1 | 24.7 | 2 | 1 | 70 |

TABLE 9-continued

Substrates treated with FC polyether urethane blends

| Ex No | FC-UR | Initial | | | Bundesmann | | | | 5 HL ironing | | |
|---|---|---|---|---|---|---|---|---|---|---|---|
| | | OR | WR | SR | 1' | 5' | 10' | % abs | OR | WR | SR |
| Co (1511.1) | | | | | | | | | | | |
| 79 | FC-UR13 | 1 | 2 | 85 | / | / | / | / | 0 | 1 | 80 |
| 80 | FC-UR10/ FC-UR13 | 2.5 | 2 | 95 | 1 | 1 | 1 | 37.8 | 1.5 | 1 | 80 |
| 81 | FC-UR3/ FC-UR13 | 3 | 1 | 75 | / | / | / | / | 2.5 | 0 | 80 |

The results demonstrated that excellent dynamic water repellency, both initial and after homelaundering could be achieved with urethanes made from HFPO-oligomer diol. Especially strong results were obtained on synthetic substrates (PESμ and PAμ). The oil repellency could be increased using a blend of urethanes made from HFPO-oligomer diol and HFPO-oligomer alcohol.

Examples 82 to 101

In examples 82 to 101, different substrates were treated with FC polyether urethanes, derived from a mixture of HFPO-oligomer alcohol and diol, so as to give 0.3% SOF. After treatment the fabrics were dried at 160° C. during 1.5 minutes. The treated substrates were tested for their oil and water repellency, initially and after 5 home launderings (ironing). The results are summarized in Table 10.

The results demonstrated that good water repellency, both initial and after laundering could be achieved with FC polyether urethanes derived from a mixture of HFPO-alcohol and HFPO-diol.

Examples 102 to 189

In examples 102 to 189, substrates were treated with fluorochemical polyether urethanes made from a mixture of HFPO-oligomer alcohols (and/or diol) and short chain fluorochemical alkyl alcohols (and/or diols). Substrates were treated with the FC polyether urethanes, as indicated in table 11, so as to give 0.3% SOF. After treatment the fabrics were dried at 160° C. during 1.5 minutes. The treated substrates were tested for their oil and water repellency, initially and after 5 home launderings (ironing). The results are summarized in Tables 11 to 14.

TABLE 10

Substrates treated with FC-polyether urethanes, derived from mixture of HFPO-oligomer alcohol and diol.

| Ex No | FC-UR | Initial | | | Bundesmann | | | | 5 HL ironing | | |
|---|---|---|---|---|---|---|---|---|---|---|---|
| | | OR | WR | SR | 1' | 5' | 10' | % abs | OR | WR | SR |
| PESμ (6145.3) | | | | | | | | | | | |
| 82 | FC-UR14 | 0 | 2 | 100 | 4.5 | 3.5 | 2.5 | 13 | 0 | 2 | 80 |
| 83 | FC-UR15 | 0 | 1.5 | 100 | 4.5 | 3.5 | 2.5 | 15.7 | 0.5 | 1 | 80 |
| 84 | FC-UR16 | 0 | 1 | 100 | 3 | 1 | 1 | 18.8 | 0 | 1 | 70 |
| 85 | FC-UR17 | 1 | 1.5 | 100 | 2.5 | 1.5 | 1 | 17.3 | 0 | 1 | 70 |
| 86 | FC-UR18 | 1 | 2 | 100 | 3 | 2 | 1 | 15.6 | 0 | 1 | 85 |
| PAμ (7819.4) | | | | | | | | | | | |
| 87 | FC-UR14 | 2 | 2 | 70 | / | / | / | / | 1 | 1 | 50 |
| 88 | FC-UR15 | 2 | 3 | 60 | / | / | / | / | 1 | 1.5 | 60 |
| 89 | FC-UR16 | 2 | 2.5 | 60 | / | / | / | / | 0 | 1 | 60 |
| 90 | FC-UR17 | 2 | 1 | 60 | / | / | / | / | 1 | 1 | 60 |
| 91 | FC-UR18 | 3 | 2 | 75 | / | / | / | / | 1.5 | 3 | 50 |
| PES/Co (2681.4) | | | | | | | | | | | |
| 92 | FC-UR14 | 3 | 2.5 | 100 | 1 | 1 | 1 | 23.8 | 2 | 2 | 80 |
| 93 | FC-UR15 | 1.5 | 3 | 95 | 1 | 1 | 1 | 23.9 | 1 | 1 | 80 |
| 94 | FC-UR16 | 1.5 | 1 | 70 | / | / | / | / | 0 | 0.5 | 60 |
| 95 | FC-UR17 | 2 | 1 | 70 | / | / | / | / | 1.5 | 1 | 60 |
| 96 | FC-UR18 | 2 | 2 | 100 | 1 | 1 | 1 | 21.7 | 2 | 1 | 70 |
| Co (1511.1) | | | | | | | | | | | |
| 97 | FC-UR14 | 2 | 2 | 90 | 1 | 1 | 1 | 36.8 | 1.5 | 1 | 80 |
| 98 | FC-UR15 | 2 | 2 | 90 | 1 | 1 | 1 | 36.5 | 0 | 1 | 80 |
| 99 | FC-UR16 | 0 | 0 | 70 | / | / | / | / | 0 | 0 | 0 |
| 100 | FC-UR17 | 2 | 1 | 70 | / | / | / | / | 1 | 0 | 50 |
| 101 | FC-UR18 | 2 | 2 | 85 | / | / | / | / | 2 | 1 | 70 |

TABLE 11

PAμ (7819.4) substrates treated with FC polyether urethanes

| Ex No | FC-UR | Initial OR | WR | SR | 5 HL Ironing OR | SR |
|---|---|---|---|---|---|---|
| 102 | FC-UR19 | 2 | 3 | 85 | 1 | 70 |
| 103 | FC-UR20 | 2.5 | 2.5 | 90 | 1 | 70 |
| 104 | FC-UR21 | 1 | 2 | 75 | 0 | 50 |
| 105 | FC-UR22 | 2 | 2.5 | 85 | 0 | 70 |
| 106 | FC-UR23 | 2.5 | 2.5 | 75 | 1 | 70 |
| 107 | FC-UR24 | 3.5 | 2.5 | 70 | 1 | 50 |
| 108 | FC-UR25 | 2.5 | 2.5 | 75 | 1.5 | 70 |
| 109 | FC-UR26 | 1.5 | 1 | 75 | 0.5 | 70 |
| 110 | FC-UR27 | 1.5 | 2.5 | 80 | 1 | 70 |
| 111 | FC-UR28 | 1.5 | 1.5 | 80 | 1 | 50 |
| 112 | FC-UR29 | 0.5 | 1.5 | 80 | 0 | 70 |
| 113 | FC-UR30 | 0.5 | 1.5 | 70 | 1 | 50 |
| 114 | FC-UR31 | 1.5 | 1.5 | 70 | 1 | 50 |
| 115 | FC-UR32 | 0 | 2 | 70 | 0 | 50 |
| 116 | FC-UR33 | 2 | 1.5 | 70 | 1.5 | 60 |
| 117 | FC-UR34 | 2 | 2 | 7 | 1.5 | 50 |
| 118 | FC-UR35 | 1.5 | 1.5 | 75 | 1 | 60 |
| 119 | FC-UR36 | 1.5 | 1.5 | 75 | 0.5 | 70 |
| 120 | FC-UR37 | 2.5 | 1.5 | 75 | 0.5 | 60 |
| 121 | FC-UR38 | 1.5 | 1.5 | 80 | 1 | 60 |
| 122 | FC-UR39 | 0.5 | 2 | 70 | 0 | 60 |
| 123 | FC-UR40 | 1.5 | 1.5 | 70 | 0.5 | 60 |

TABLE 12

Co (1511.1) substrate treated with FC polyether urethanes

| Ex No | FC-UR | Initial OR | WR | SR | 5 HL Ironing OR | SR |
|---|---|---|---|---|---|---|
| 124 | FC-UR19 | 3 | 3 | 50 | 0 | 0 |
| 125 | FC-UR20 | 2 | 2 | 85 | 1 | 70 |
| 126 | FC-UR21 | 1.5 | 2 | 100 | 1 | 90 |
| 127 | FC-UR22 | 2.5 | 1.5 | 60 | 1 | 0 |
| 128 | FC-UR23 | 2.5 | 2 | 85 | 2 | 70 |
| 129 | FC-UR24 | 2.5 | 1 | 50 | 1 | 0 |
| 130 | FC-UR25 | 3 | 2 | 90 | 2 | 70 |
| 131 | FC-UR26 | 3 | 2 | 85 | 1.5 | 75 |
| 132 | FC-UR27 | 2 | 2 | 90 | 1 | 75 |
| 133 | FC-UR28 | 2 | 2 | 80 | 1.5 | 70 |
| 134 | FC-UR29 | 1 | 2 | 85 | 1 | 80 |
| 135 | FC-UR30 | 2 | 2 | 80 | 0.5 | 70 |
| 136 | FC-UR31 | 2 | 2 | 80 | 2 | 70 |
| 137 | FC-UR32 | 0.5 | 2 | 90 | 0 | 80 |
| 138 | FC-UR33 | 3 | 2 | 75 | 2 | 70 |
| 139 | FC-UR34 | 3.5 | 1 | 75 | 2 | 70 |
| 140 | FC-UR35 | 2 | 2 | 80 | 2 | 70 |
| 141 | FC-UR36 | 2 | 2 | 85 | 2 | 80 |
| 142 | FC-UR37 | 2.5 | 1 | 80 | 2 | 70 |
| 143 | FC-UR38 | 2.5 | 1.5 | 80 | 2 | 70 |
| 144 | FC-UR39 | 2 | 1 | 70 | 1.5 | 70 |
| 145 | FC-UR40 | 2.5 | 1 | 70 | 1.5 | 70 |

TABLE 13

PES/Co (2681.4) substrate treated with FC polyether urethanes

| Ex No | FC-UR | Initial OR | WR | SR | 5 HL Ironing OR | SR |
|---|---|---|---|---|---|---|
| 146 | FC-UR19 | 4 | 3 | 75 | 1 | 0 |
| 147 | FC-UR20 | 2 | 2.5 | 90 | 1 | 75 |
| 148 | FC-UR21 | 1.5 | 2.5 | 100 | 1 | 85 |
| 149 | FC-UR22 | 3.5 | 3 | 75 | 1 | 50 |
| 150 | FC-UR23 | 3 | 2.5 | 95 | 2 | 70 |
| 151 | FC-UR24 | 3.5 | 2.5 | 70 | 2 | 0 |
| 152 | FC-UR25 | 4 | 2.5 | 100 | 1 | 75 |
| 153 | FC-UR26 | 3.5 | 2.5 | 100 | 2 | 75 |
| 154 | FC-UR27 | 3 | 2.5 | 100 | 2 | 80 |
| 155 | FC-UR28 | 2.5 | 2.5 | 85 | 1.5 | 75 |
| 156 | FC-UR29 | 2 | 2.5 | 90 | 1 | 80 |
| 157 | FC-UR30 | 2.5 | 2 | 90 | 1.5 | 75 |
| 158 | FC-UR31 | 2.5 | 2.5 | 80 | 2 | 70 |
| 159 | FC-UR32 | 0.5 | 2 | 90 | 0 | 75 |
| 160 | FC-UR33 | 3 | 2 | 75 | 2 | 50 |
| 161 | FC-UR34 | 4 | 2 | 75 | 2.5 | 70 |
| 162 | FC-UR35 | 3 | 2.5 | 85 | 2 | 70 |
| 163 | FC-UR36 | 2.5 | 2 | 90 | 2 | 70 |
| 164 | FC-UR37 | 2.5 | 2 | 80 | 2 | 70 |
| 165 | FC-UR38 | 3 | 2 | 80 | 2 | 70 |
| 166 | FC-UR39 | 2.5 | 2 | 75 | 1.5 | 70 |
| 167 | FC-UR40 | 2.5 | 2 | 50 | 1.5 | 70 |

TABLE 14

PESμ (6145.3) substrate treated with FC polyether urethanes

| Ex No | FC-UR | Initial OR | WR | SR | 5 HL Ironing OR | SR |
|---|---|---|---|---|---|---|
| 168 | FC-UR19 | 2 | 2.5 | 90 | 0.5 | 85 |
| 169 | FC-UR20 | 1.5 | 2 | 100 | 0 | 85 |
| 170 | FC-UR21 | 0 | 2 | 100 | 0 | 85 |
| 171 | FC-UR22 | 1.5 | 2.5 | 100 | 0.5 | 80 |
| 172 | FC-UR23 | 1 | 2 | 100 | 0 | 85 |
| 173 | FC-UR24 | 2 | 2.5 | 80 | 1 | 80 |
| 174 | FC-UR25 | 2 | 2 | 90 | 0.5 | 80 |
| 175 | FC-UR26 | 1.5 | 2 | 90 | 0 | 80 |
| 176 | FC-UR27 | 0.5 | 2 | 100 | 0 | 90 |
| 177 | FC-UR28 | 1 | 2 | 100 | 0 | 90 |
| 178 | FC-UR29 | 0.5 | 2 | 100 | 0 | 90 |
| 179 | FC-UR30 | 1 | 2 | 90 | 0 | 80 |
| 180 | FC-UR31 | 1 | 2 | 100 | 0 | 85 |
| 181 | FC-UR32 | 0 | 1.5 | 100 | 0 | 90 |
| 182 | FC-UR33 | 1.5 | 2 | 80 | 1.5 | 70 |
| 183 | FC-UR34 | 2 | 2 | 80 | 1 | 75 |
| 184 | FC-UR35 | 1 | 2 | 100 | 0 | 85 |
| 185 | FC-UR36 | 0.5 | 2 | 100 | 0 | 85 |
| 186 | FC-UR37 | 1.5 | 2 | 100 | 0 | 85 |
| 187 | FC-UR38 | 1.5 | 2 | 90 | 0 | 80 |
| 188 | FC-UR39 | 1 | 1.5 | 80 | 0 | 75 |
| 189 | FC-UR40 | 1.5 | 1.5 | 80 | 0 | 75 |

Substrates with high and durable oil and/or water repellency could be made.

Examples 190 to 195

In examples 190 to 195 cotton samples were treated with fluorochemical polyether urethane FC-UR43, so as to give and add-on level as indicated in Table 15. The samples were cured at 150° C. during 10 minutes. The oil and water repellency were measured initially and after 10 HL and 20 HL. The results are given in Table 15.

TABLE 15

| Ex No | Substrate | % SOF | Initial OR | Initial SR | 10 HL OR | 10 HL SR | 20 HL OR | 20 HL SR |
|---|---|---|---|---|---|---|---|---|
| 190 | IND | 0.2 | 3 | 60 | 1 | 0 | 0 | 0 |
| 191 | IND | 0.5 | 5 | 75 | 4 | 50 | 3 | 50 |
| 192 | IND | 1 | 5 | 80 | 4 | 50 | 3 | 50 |
| 193 | SHIP | 0.2 | 3 | 60 | 1 | 0 | 0 | 0 |
| 194 | SHIP | 0.5 | 5 | 75 | 3 | 50 | 2 | 50 |
| 195 | SHIP | 1 | 5 | 80 | 4 | 70 | 3 | 60 |

Cotton substrates having especially high oil repellency, even after repeated home launderings were made. Also good durable water repellency was noticed.

Examples 196 to 207

In examples 196 to 207 cotton samples were treated with fluorochemical polyether urethanes FC-UR41 and FC-UR42, derived from short chain HFPO oligomers and polymeric alcohols, so as to give and add-on level as indicated in Table 16. The samples were air dried and cured at 150° C. during 10 minutes. The oil and water repellency were measured after air dry, after 150° C. cure and after 5 HL. No water repellency was observed after air dry or 5 HL. Results are given in Table 16.

TABLE 16

| Ex | FC-UR | Substrate | % SOF | Air dry OR | Initial OR | Initial SR | 5 HL OR |
|---|---|---|---|---|---|---|---|
| 196 | FC-UR41 | IND | 0.2 | 2 | 3 | 60 | 0 |
| 197 | FC-UR41 | IND | 0.5 | 4 | 5 | 95 | 2 |
| 198 | FC-UR41 | IND | 1 | 5 | 5 | 95 | 3 |
| 199 | FC-UR41 | SHIPP | 0.2 | 2 | 3 | 60 | 0 |
| 200 | FC-UR41 | SHIPP | 0.5 | 5 | 4 | 90 | 2.5 |
| 201 | FC-UR41 | SHIPP | 1 | 5 | 4.5 | 90 | 4 |
| 202 | FC-UR42 | IND | 0.2 | / | 2 | 0 | 0 |
| 203 | FC-UR42 | IND | 0.5 | / | 5 | 70 | 2 |
| 204 | FC-UR42 | IND | 1 | / | 5 | 100 | 4 |
| 205 | FC-UR42 | SHIPP | 0.2 | / | 2 | 60 | 0 |
| 206 | FC-UR42 | SHIPP | 0.5 | / | 5 | 70 | 2.5 |
| 207 | FC-UR42 | SHIPP | 1 | / | 5 | 80 | 4 |

Cotton substrates having high oil and water repellency were obtained.

Examples 208 and 209 and Comparative Examples C-17 and C-18

In example 208 and 209, polyamide carpet samples were treated with an emulsion containing 0.6% FC polyether urethane FC-UR4 (emulsified with SERMUL™ EA266), by spray application, to give 30% WPU. The carpet samples were dried at 120° C. during 15-20 min. Comparative examples C-17 and C-18 were untreated polyamide carpet samples. Oil repellency (OR), water repellency (WR) and Accelerated Dry Soil (ADS) were measured and are report in Table 17.

TABLE 17

| | Carpet treated with FC polyether urethane | | | | |
|---|---|---|---|---|---|
| Ex No | Carpet | FC-UR4 | WR | OR | ADS |
| 208 | NS1 | 0.6% solids; 30% WPU | 3 | 4 | 3 |
| 209 | NS2 | 0.6% solids; 30% WPU | 2 | 1.5 | 3 |
| C-17 | NS1 | / | 0 | 0 | 1.5 |
| C-18 | NS2 | / | 0 | 0 | 2 |

As can be seen from the results, a considerable improvement of repellency properties and soil resistance were observed when the carpet samples were treated with a composition according to the invention.

Examples 210 to 215

In examples 210 to 215 cotton and polyester/cotton samples were treated with fluorochemical polyether urethane FC-UR46, so as to give an add-on level as indicated in table 18. The samples were cured at 150° C. during 10 minutes. The oil and water repellency were measured initially and after 10 HL, 20 HL, 30 HL, 40 HL and 50 HL. The results are given in Table 18.

TABLE 18

| Example | Substrate | % SOF | Initial OR | Initial SR | 10 HL OR | 10 HL SR | 20 HL OR | 20 HL SR | 30 HL OR | 30 HL SR | 40 HL OR | 40 HL SR | 50 HL OR | 50 HL SR |
|---|---|---|---|---|---|---|---|---|---|---|---|---|---|---|
| 210 | SHIPP | 0.2 | 1.75 | 85 | 1 | 80 | 0 | 80 | / | / | / | / | / | / |
| 211 | SHIPP | 0.5 | 5 | 100 | 4 | 100 | 3 | 100 | 2 | 100 | 2 | 100 | 2 | 78 |
| 212 | SHIPP | 1.0 | 5 | 100 | 4.25 | 100 | 4 | 95 | 3 | 100 | 3 | 100 | 3 | 95 |
| 213 | Reeve | 0.2 | 1 | 80 | 0 | 75 | 0 | 70 | / | / | / | / | / | / |
| 214 | Reeve | 0.5 | 5 | 100 | 2 | 100 | 1.3 | 95 | 1 | 95 | 1 | 95 | 1 | 80 |
| 215 | Reeve | 1.0 | 4.25 | 100 | 3 | 100 | 2 | 100 | 2 | 100 | 2 | 100 | 2 | 95 |

Examples 216 to 217

In examples 216 to 217 cotton and polyester/cotton samples were treated with fluorochemical polyether urethane FC-UR47, so as to give an add-on level as indicated in table 19. The samples were cured at 150° C. during 10 minutes. The oil repellency was measured initially and after 10 HL. The results are given in Table 19.

TABLE 19

| Example (with FC-UR47) | Substrate | % SOF | Initial OR | 10 HL OR |
|---|---|---|---|---|
| 216 | SHIPP | 0.5 | 4 | 3 |
|  |  | 1.0 | 5 | 5 |
| 217 | Reeve | 0.5 | 4 | 2.5 |
|  |  | 1.0 | 5 | 4 |

Examples 218 to 219

In examples 218 to 219 cotton and polyester/cotton samples were treated with fluorochemical polyether urethane FC-UR47, so as to give an add-on level as indicated in table 20. The samples were cured at 150° C. during 10 minutes. The stain release (K, E, and C) was measured initially and after 20 HL. The results are given in table 20.

TABLE 20

| Example (with FC-UR47) | Substrate | % SOF | Initial | | | 20 HL | | |
|---|---|---|---|---|---|---|---|---|
|  |  |  | K | E | C | K | E | C |
| 218 | SHIPP | 0.5 | 7.5 | 7.5 | 4 | 8 | 8 | 5.5 |
| 219 | Reeve | 0.5 | 6 | 5 | 4 | 6 | 6 | 5 |

Examples 220 to 231

In Examples 220 to 231 cotton and poly/cotton samples were treated with fluorochemical polyether urethane FC-UR44 or FC-UR45, so as to give an add-on level as indicated in table 21. The samples were cured at 150° C. during 10 minutes. Oil and water repellency data was measured initially, after 30 HL and after 50 HL. The results are given in table 21.

TABLE 21

| Example | FC-UR | Substrate | % SOF | Initial | | 30 HL | | 50 HL | |
|---|---|---|---|---|---|---|---|---|---|
|  |  |  |  | OR | SR | OR | SR | OR | SR |
| 220 | FC-UR44 | SHIPP | 0.2 | 2 | 50 | 0 | 0 | / | / |
| 221 | FC-UR44 | SHIPP | 0.5 | 4 | 60 | 2 | 0 | 1 | 0 |
| 222 | FC-UR44 | SHIPP | 1.0 | 5 | 75 | 2.25 | 60 | 2 | 0 |
| 223 | FC-UR44 | Reeve | 0.2 | 1.75 | 70 | 0 | 50 | / | / |
| 224 | FC-UR44 | Reeve | 0.5 | 4 | 70 | 1.50 | 60 | 2 | 70 |
| 225 | FC-UR44 | Reeve | 1.0 | 4 | 75 | 2.5 | 75 | 2 | 70 |
| 226 | FC-UR45 | SHIPP | 0.2 | 4 | 50 | 0 | 0 | 0 | 0 |
| 227 | FC-UR45 | SHIPP | 0.5 | 5 | 60 | 4 | 0 | 3 | 0 |
| 228 | FC-UR45 | SHIPP | 1.0 | 5 | 60 | 5 | 50 | 4.25 | 0 |
| 229 | FC-UR45 | Reeve | 0.2 | 3 | 72.5 | 1 | 60 | 0 | 0 |
| 230 | FC-UR45 | Reeve | 0.5 | 4.5 | 70 | 2.5 | 60 | 2 | 0 |
| 231 | FC-UR45 | Reeve | 1.0 | 4.5 | 80 | 3 | 80 | 2.5 | 77.5 |

Examples 232 and 233

In Examples 232 and 233 cotton and poly/cotton samples were treated with fluorochemical polyether urethane FC-UR48, so as to give an add-on level as indicated in table 22. The samples were cured at 150° C. during 10 minutes. The stain release (K, E, and C) was measured initially, after 10 HL and after 30 HL. The results are given in Table 22.

TABLE 22

| Ex | Substrate | % SOF | Initial | | | | 10 HL | | | | 30 HL | | | |
|---|---|---|---|---|---|---|---|---|---|---|---|---|---|---|
|  |  |  | OR | K | E | C | OR | K | E | C | OR | K | E | C |
| 232 | SHIPP | 0.5 | 4 | 7 | 7 | 5 | 3 | 7 | 6.5 | 4.5 | 1 | 6.5 | 7 | 5 |
| 233 | Reeve | 0.5 | 5 | 6 | 6 | 4 | 4.75 | 6.5 | 5 | 5 | 3 | 6 | 6 | 5 |

Preparation of FC-UR49; Fluorochemical Urethane MeFBSE/N3300/PEG 1450/APTES

A 1 liter flask was charged with MeFBSE (58.89 g), DBTDL (3 drops; ~20 mg) and MIBK(237.0 g). The temperature of the stirred mixture was raised to 60° C. under a purge of dry nitrogen. DES N3300 (40.0 g) was then slowly added, maintaining the temperature between 60-65° C. Upon completion of the addition, the reaction mixture was stirred for 1 hour at 60° C. APTES (3.42 g) was then added dropwise, keeping the temperature of the reaction mixture below 65° C. The reaction mixture was stirred for 30 minutes. Solid PEG 1450 (18.69 g) was added to the stirred mixture, and the reaction was followed to completion via FTIR, as determined by disappearance of the —NCO band at approximately 2289 wavenumbers.

Emulsification: To this vigorously stirred organic mixture was slowly added deionized water (944 g; at 60° C.). This pre-emulsion mixture was then sonicated for 2 minutes. A rotary evaporator connected to an aspirator was used to strip the MIBK from the mixture. The resulting emulsion was 20-30% solids.

Examples 234 and 239 and Comparative Examples C-19 to C-30

TABLE 23

| Ex | Substrate | % FC-UR49 | % FC-UR48 | Initial Spray | Intial OR | Intial C |
|---|---|---|---|---|---|---|
| 234 | SHIPP | 0.25 | 0.25 | 75 | 3 | 4 |
| 235 | SHIPP | 0.50 | 0.50 | 70 | 5 | 5 |
| 236 | K-2 | 0.25 | 0.25 | 80– | 7 | 7 |
| 237 | K-2 | 0.50 | 0.50 | 75 | 7 | 7 |
| 238 | TCIK | 1.0 | 1.0 | — | 5 | 6 |
| 239 | TCTK | 1.0 | 1.0 | — | 5 | 6 |
| C-19 | SHIPP | 0.50 | — | 60 | 1 | 6.5 |
| C-20 | SHIPP | — | 0.50 | 50 | 4 | 3 |
| C-21 | SHIPP | 1.0 | — | 75 | 5 | 7 |
| C-22 | SHIPP | — | 1.0 | 75 | 5 | 4 |
| C-23 | K-2 | 0.50 | — | 80 | 7 | 7 |
| C-24 | K-2 | — | 0.50 | 75 | 5 | 4 |
| C-25 | K-2 | 1.0 | — | 80+ | 7 | 7.5 |
| C-26 | K-2 | — | 1.0 | 80– | 7 | 3 |
| C-27 | TCIK | 2.0 | — | — | 5 | 7 |
| C-28 | TCIK | — | 2.0 | — | 5 | 3 |
| C-29 | TCTK | 2.0 | — | — | 5 | 6.5 |
| C-30 | TCTK | — | 2.0 | — | 5 | 5 |

The data listed in Table 23 demonstrates the improvement in Stain C (particulate oily stain release) by addition of FC-UR49 to the formulations, with little or no resultant negative effect on the repellent attributes.

The invention claimed is:

1. Fluorochemical composition comprising a dispersion or a solution of
   (A) a fluorinated repellent compound, wherein said fluorinated compound comprises the reaction product of:
      (i) a fluorinated polyether according to the formula:

$R^1_f-O-[CF(CF_3)-CF_2O]_n-CF(CF_3)-A-Q^1-T_k$ wherein $R^1_f$ represents a perfluorinated alkyl group, n is an integer of 3 to 25, A is a carbonyl group or $CH_2$, $Q^1$ is a chemical bond or an organic divalent or trivalent linking group and T represents a functional group capable of reacting with an isocyanate and k is 1 or 2, wherein the perfluorinated polyether group has a weight average molecular weight of at least 750 g/mol to about 100,000 g/mol;
      (ii) an isocyanate component selected from a polyisocyanate compound that has at least 3 isocyanate groups or a mixture of polyisocyanate compounds wherein the average number of isocyanate groups per molecule is more than 2;
      (iii) a non-fluorinated oxime blocking agent; and
      (iv) optionally one or more co-reactants capable of reacting with an isocyanate group selected from the group consisting of water, monofunctional alcohols, diols and perfluoroaliphatic compounds of the formula:

$(R_f^4)_x$-L-Y, wherein $R_f^4$ represents a perfluoroaliphatic group having 3 to 6 carbon atoms, L represents a non-fluorinated organic divalent or multi-valent linking group, Y represents an isocyanate-reactive functional group and x is an integer of 1 to 20, and
   (B) a fluorochemical stain release compound.

2. Fluorochemical composition according to claim 1 wherein T is selected from the group consisting of hydroxy and amino groups.

3. Fluorochemical composition according to claim 1 wherein said reaction product is obtained by reacting between 5 and 100 mole % of the isocyanate groups of the isocyanate component have been reacted with said fluorinated polyether of formula (I) and wherein the remainder of the isocyanate groups has been reacted with a said one or more coreactants.

4. The composition of claim 1 wherein said component (B) comprises one or more urethane oligomers of at least two repeating units selected from the group consisting of fluorine-containing urethane oligomers and long-chain hydrocarbon-containing urethane oligomers, wherein said oligomers comprise the reaction product of:
   (a) one or more polyfunctional isocyanate compounds;
   (b) one or more polyols;
   (c) one or more monoalcohols selected from the group consisting of fluorocarbon monoalcohols, optionally substituted long-chain hydrocarbon monoalcohols, and mixtures thereof;
   (d) one or more silanes of the following formula:

$X-R^{11}-Si-(Y)_3$ wherein
   X is $-NH_2$; $-SH$; $-OH$; $-N=C=O$; or $-NRH$ where R is selected from the group consisting of phenyl, straight and branched aliphatic, alicyclic, and aliphatic ester groups; $R^1$ is an alkylene. heteroalkylene, aralkylene, or heteroaralkylene group; and
   each Y is independently a hydroxyl; a hydrolyzable moiety selected from the group consisting of alkoxy, acyloxy, heteroalkyoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety; and
   optionally (e) one or more water-solubilizing compounds comprising one or more water-solubilizing groups and at least one isocyanate-reactive hydrogen containing group.

5. The chemical composition of claim 4 wherein the diol is selected from the group consisting of a branched- or straight-chain hydrocarbon diol, a diol containing at least one solubilizing group, a fluorinated diol comprising a monovalent or divalent perfluorinated group, a diol comprising a silane group, a polyalkylsiloxane diol, a polyarylsiloxane diol, and mixtures thereof.

6. The chemical composition of claim 4 wherein the fluorocarbon monoalcohol is a compound of the following formula:

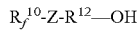

wherein:
$R_f^{10}$ is a perfluoroalkyl group or a perfluoroheteroalkyl group;
Z is a connecting group selected from a covalent bond, a sulfonamido group, a carboxamido group, a carboxyl group, or a sulfinyl group; and
$R^{12}$ is a divalent straight- or branched-chain alkylene, cycloalkylene, or heteroalkylene group of 1 to 14 carbon atoms.

7. The chemical composition of claim 6 wherein $R_f^{10}$ is a perfluoroalkyl group of 2 to 6 carbons.

8. The chemical composition of claim 4 wherein component (B) comprises the reaction product of:
one or more polyfunctional isocyanate compounds and one or more polyols having a molar ratio of from about 1:0.25 to about 1:0.45;
one or more polyfunctional isocyanate compounds and one or more monoalcohols having a molar ratio of from about 1:0.30 to about 1:0.60;
one or more polyfunctional isocyanate compounds and one or more silanies, of formula (I), having a molar ratio of from about 1:0.001 to about 1:0.15; and
one or more polyfunctional isocyanate compounds and one or more water-solubilizing compounds having a molar ratio of from about 1:0 to about 1:1.6.

9. A coating composition comprising a solution comprising the chemical composition of claim 1 and a solvent.

10. Fluorochemical composition according to claim 1 wherein said fluorinated compounds (A) and (B) are dispersed in water or an organic solvent.

11. Fluorochemical composition according to claim 1 wherein said fluorinated compounds (A) and (B) are dispersed in water and wherein the aqueous dispersion contains a surfactant.

12. Fluorochemical composition according to claim 1 wherein the amount of fluorinated compounds (A) and (B) in the composition is between 0.1% by weight and 10% by weight.

13. Method of treatment of a fibrous substrate, comprising applying to the fibrous substrate a fluorochemical composition of claim 1.

14. Method according to claim 13 wherein the amount of the fluorochemical composition applied is such that the amount of fluorinated compounds (A) and (B) is between 0.2% by weight and 3% by weight relative to the weight of the fibrous substrate.

15. Fluorochemical composition according to claim 1 wherein said reaction product is obtained by reacting between 10 to 30% of the isocyanate groups of the isocyanate component with the perfluorinated polyether compound according to formula (I), between 90 and 30% of the isocyanate groups with a non-fluorinated oxime blocking agent and the remainder of the isocyanate groups of the isocyanate component is reacted with one or more of said co-reactants.

* * * * *